(12) United States Patent
Elberbaum

(10) Patent No.: US 8,384,249 B2
(45) Date of Patent: Feb. 26, 2013

(54) METHOD AND APPARATUS FOR COMBINING AC POWER RELAY AND CURRENT SENSORS WITH AC WIRING DEVICES

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 183 days.

(21) Appl. No.: 13/086,610

(22) Filed: Apr. 14, 2011

(65) Prior Publication Data

US 2012/0262006 A1   Oct. 18, 2012

(51) Int. Cl.
*B23K 11/24* (2006.01)
*H02B 1/24* (2006.01)
(52) U.S. Cl. .......................................... 307/112
(58) Field of Classification Search ................ 307/112, 307/115, 116, 140; 398/141
See application file for complete search history.

(56) References Cited

U.S. PATENT DOCUMENTS

| | | | |
|---|---|---|---|
| 5,923,363 A | 7/1999 | Elberbaum |
| 6,603,842 B2 | 8/2003 | Elberbaum |
| 6,940,957 B2 | 9/2005 | Elberbaum |
| 6,993,417 B2 | 1/2006 | Osann, Jr. |
| 7,290,702 B2 | 11/2007 | Elberbaum |
| 7,461,012 B2 | 12/2008 | Elberbaum |
| 7,639,907 B2 | 12/2009 | Elberbaum |
| 7,649,727 B2 | 1/2010 | Elberbaum |
| 7,864,500 B2 | 1/2011 | Elberbaum |
| 2002/0060530 A1* | 5/2002 | Sembhi et al. ................ 315/291 |
| 2008/0068207 A1 | 3/2008 | Elberbaum |
| 2008/0258563 A1 | 10/2008 | Hodges |
| 2010/0278537 A1 | 11/2010 | Elberbaum |

FOREIGN PATENT DOCUMENTS

EP   1 260 886   11/2002

OTHER PUBLICATIONS

U.S. Appl. No. 12/725,808, filed Mar. 17, 2010.
U.S. Appl. No. 12/761,484, filed Apr. 16, 2010.
U.S. Appl. No. 12/963,876, filed Dec. 9, 2010.
International Search Report dated Oct. 29, 2012, from corresponding International Application No. PCT/US2012/029442.

* cited by examiner

*Primary Examiner* — Carlos Amaya
(74) *Attorney, Agent, or Firm* — Katten Muchin Rosenman LLP

(57) ABSTRACT

A method and a device for joining a remotely controlled switching and current sensing AC device structured for attachment to standard and popular three way SPDT AC switches or cross DPDT AC switches and/or power outlets, such that the front wall plate of a single gang electrical box will cover the joined AC device with the manual switch or the AC outlet. The AC device is operated and communicates via lightguide or fiber optic cable using two way optical signals and via IR in air in line of sight and/or via RF in air. The lightguide is cascaded in series from one AC device to another and/or from a joint switch device to a joined AC outlet and to an optoport in front of an outlet socket for communicating the current drain and/or operation controls with the appliance, powered by the AC socket, via a lightguide included in the power cable with plug assembly of the appliance.

26 Claims, 13 Drawing Sheets

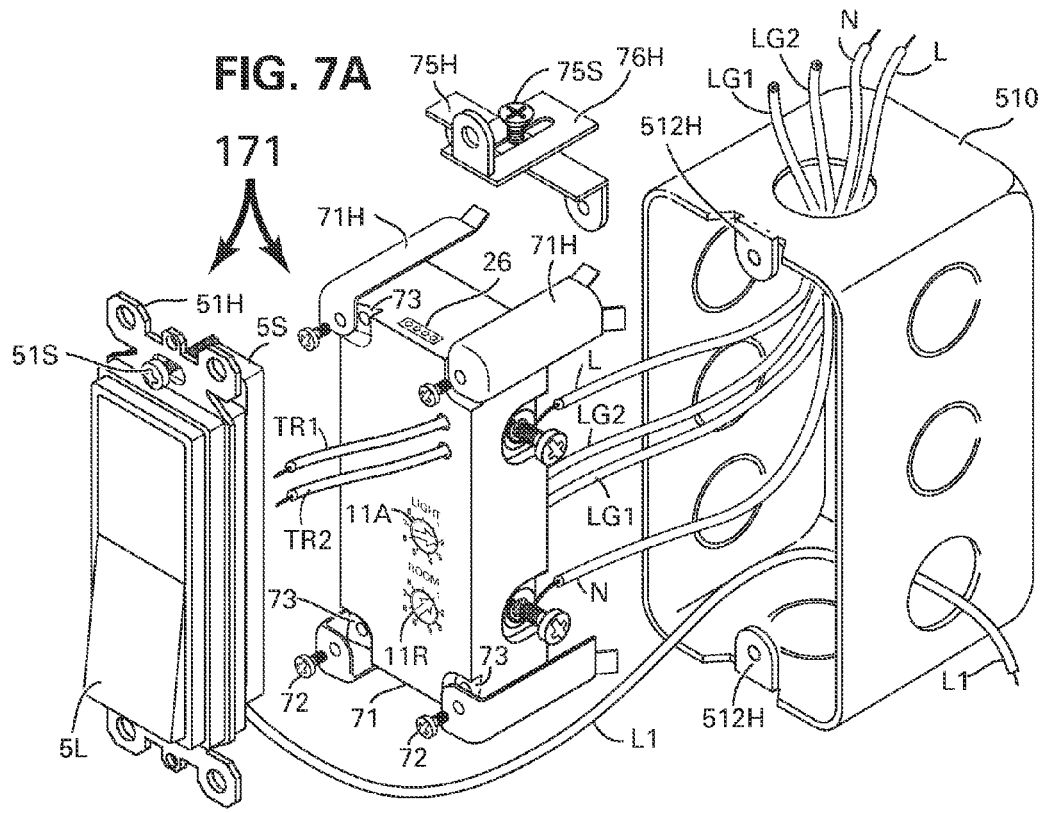
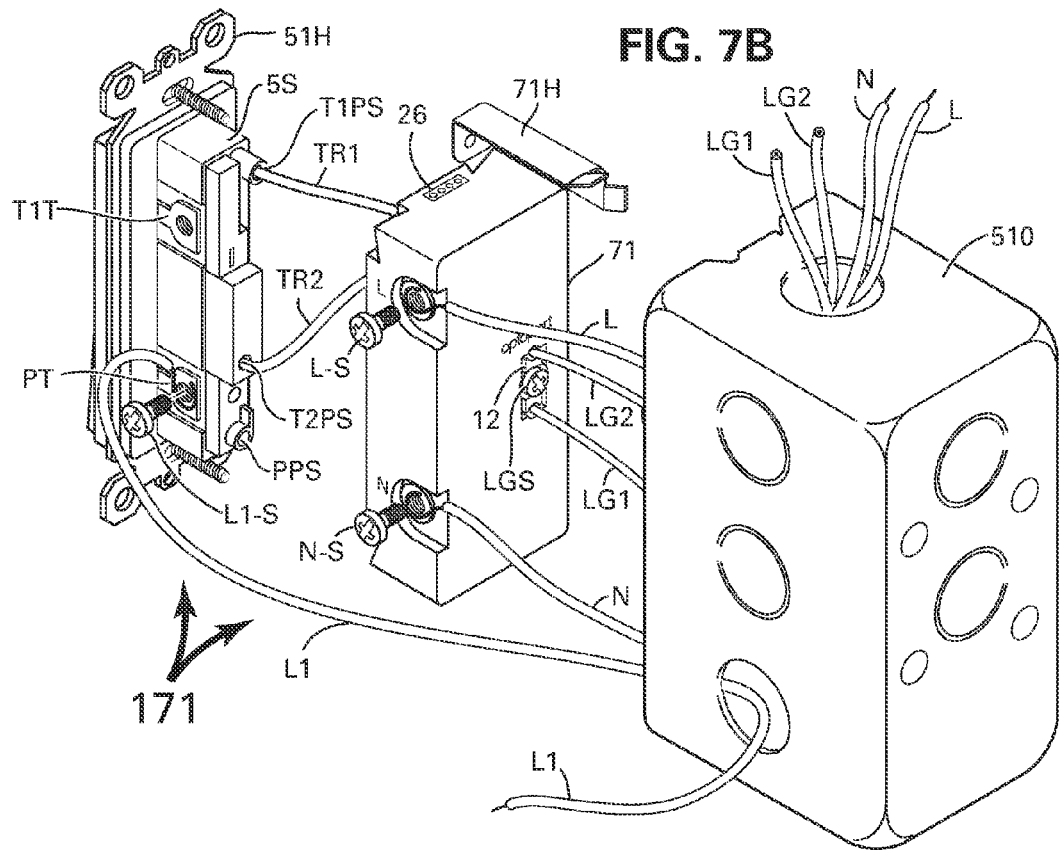

150 or 155

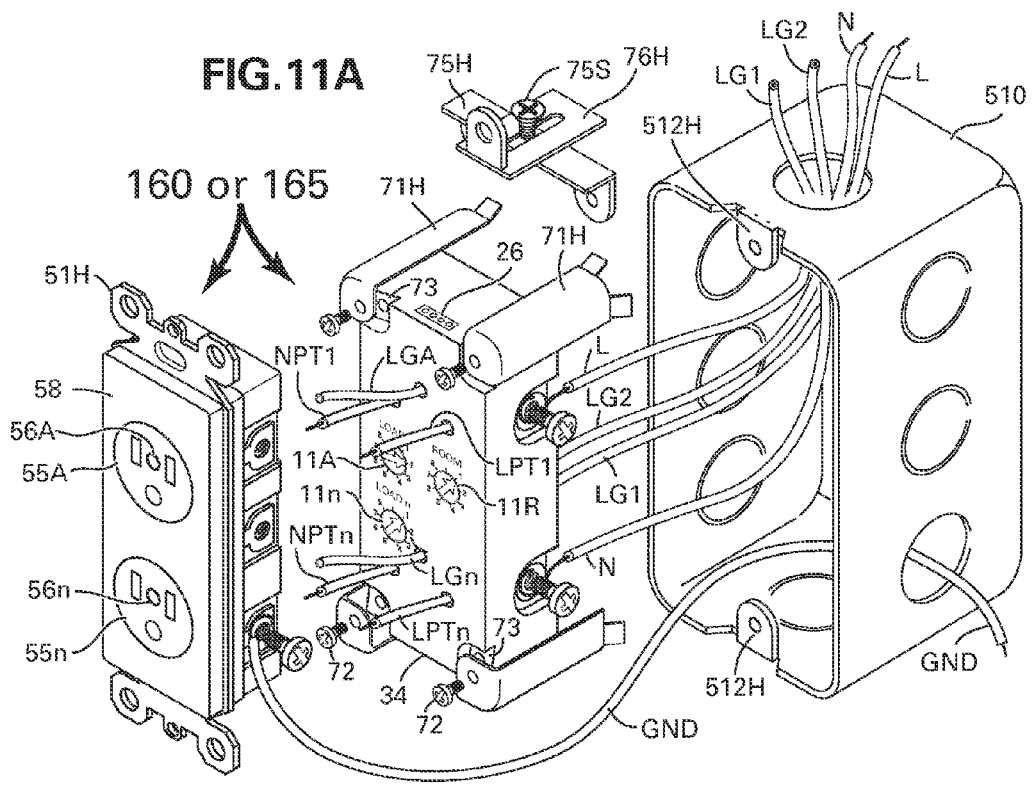
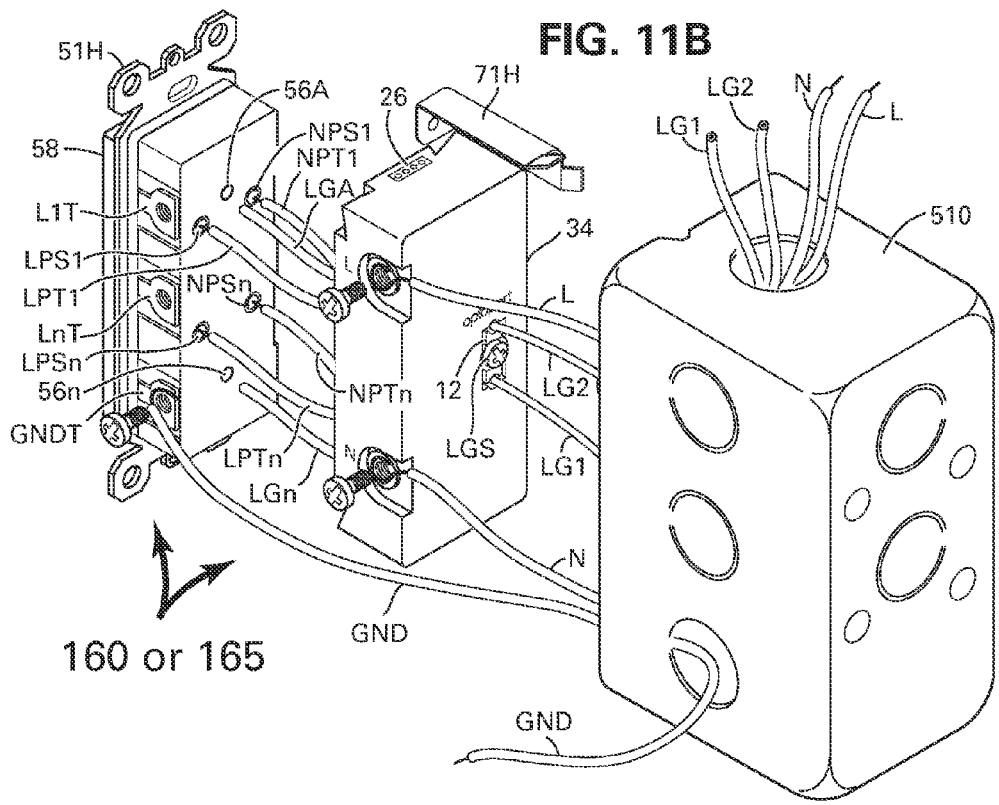

METHOD AND APPARATUS FOR COMBINING AC POWER RELAY AND CURRENT SENSORS WITH AC WIRING DEVICES

BACKGROUND OF THE INVENTION

1. Field of the Invention

This invention is related to remotely operating SPDT AC power semiconductor switches or relays used in home automation operated via wireless remote control or plastic optical fiber and lightguide cables in combination with mechanical SPDT power switches, including current sensors and power outlets.

2. Description of the Prior Art

Remotely operating AC power relays switch on and off electrical appliances such as home heaters, air conditioners, motorized curtains, lighting and other electrical appliances in homes, apartments, offices and buildings. Verifying the operation status of a remotely operated appliance however is complex. Almost all of the appliances do not report their status and the person operating the remote control device has to verify the on or off status of the operated device by being at the site of the operated appliance and see for himself if the lights are on or off, or the aircondition unit is activated or not.

Most of the remote control devices including IR or RF wireless remote control units use the same power key (and code) to switch the appliance on and off, therefore without the operating person's self verification on site, with most of currently available remotely controlled systems it is impossible to positively verify the on-off power status from a remote site.

On the other hand home automation relay devices, operated via two way communication signals, can update the system controller by the relay's status or the command sent to the relay. The problems such system represents are a. the need to re-design the whole electrical wiring system requiring the customizing of the AC electrical wiring structure and expertise to configure, install and maintain, all of which are expensive and b. the current drain reporting on the basis of the relay status does not reliably provide real time statuses, for example, a boiler's relay status will remain on even though no current is drained when the boiler's power is cut by the boiler thermostat.

The commonly standard wired electrical systems provide only two wires, the AC live or hot wire and the load wire connecting the switches to light fixture or other appliances. Similar two only traveler wires are used for connecting cascading switches that independently switch on-off the same light or appliance.

Further, almost all of the known AC wiring regulations and building codes forbid the connections, mixing and mingling of AC power wires with low voltage signal wires inside the same electrical box and/or the connecting, the mixing or the mingling of AC power wires with low voltage control wires within the same conduit and/or the same relay in the same wall box and/or with other electrical power devices inside a wall box. For this reason a power supply for the remote control circuits of such remotely operated power switching devices must be structured inside within the AC switch and powered by the AC power. Such strict electrical and building codes narrowed the controls of home automation devices to basic three communication signals including wireless (IR and RF) and modulated RF via the AC power lines.

The significance with remote controlling of home automation systems of current days is the ability to switch electrical appliances on and off remotely via PCs through the Internet, via mobile telephones, iPad and/or via other PDA devices.

The problem however for such remote controlling is the need for a verified on-off status of the appliances being operated and/or the availability of a status report covering all the remotely controlled appliances of a given house, office, apartment or a building. The power consumption reporting including specific itemized consumption of each individual house, apartment, office and businesses is a major objective and the center focus of power station management, municipalities and governments throughout the world.

Devices for detecting the on-off status or a standby status and current drain is disclosed in U.S. Pat. Nos. 7,649,727 and 7,864,500, IR devices for communicating such on-off or standby statuses via two way RF or IR remote control system along with IR remote control devices for operating AC power switches and AC operated appliances are disclosed in U.S. Pat. No. 7,639,907 and such devices operated through lightguide or fiber optic cable are disclosed in U.S. patent application Ser. Nos. 12/236,656, 12/725,808, 12/761,484 and 12/963,876 with the content of the three referenced US patents and the four applications are incorporated herein by reference.

Similarly, such method and apparatuses for integrating remote control devices with video interphone systems and shopping terminals are also disclosed in U.S. Pat. Nos. 7,290,702 and U.S. application Ser. No. 11/509,315 dated Aug. 24, 2006.

For all the disclosed and known power switching and control devices, there is a need to access the devices i.e., establishing the connectivity for feeding control signals and retrieving a switch status and/or the current consumption via the switch or via power outlets. But the electrical safety codes and regulations that forbid connections of a low voltage communication line to an AC power switch and AC power outlets held back the needed power consumption reporting until now. To provide reliable on-off and other operating command propagation and receive in return a status report and to enable a non restricted connectivity between a low voltage control devices and an AC power switches and outlets, the use of the optical fiber and lightguide was introduced in the above referenced US patents applications.

Further, the remotely controlled SPDT relay disclosed in U.S. Pat. Nos. 7,649,727 and 7,864,500 provide for combining automation relays and current sensors in electrical box adjacent to the mechanical SPDT switch, or adjacent to the SPDT switch itself within the same electrical box. However, the users do not prefer to have two adjacent devices for operating for example, the same light, and moreover it is not architecturally pleasing to expand the number of electrical boxes, switching devices and/or lineup decorative covers on the walls, and a need for a less visible or non-noticeable integration of the remotely operated SPDT relays with the standard manually actuated SPDT switches is needed.

SUMMARY OF THE INVENTION

It is an object of the present invention to provide a method and apparatus for physically attaching or joining AC power SPDT relays and current sensors to manually actuated SPDT AC power switches, or attach the AC power relays into the rear of the electrical box behind the manual SPDT switch. The AC current sensors are disclosed in the above referenced U.S. Pat. Nos. 7,649,727 and 7,864,500. Relays and current sensors operating via lightguide or fiber optic cable are disclosed in U.S. patent application Ser. Nos. 12/236,656, 12/725,808, 12/761,484 and 12/963,876, all incorporated herein by reference.

Another object of the present invention is to operate and monitor the status of the electrical appliances through a dedicated controller, and/or video interphones and/or "shopping terminals" and/or via a communication network including the generating and propagating control codes and signals from the dedicated controller, the video interphones and the shopping terminals to the different appliances through an IR driver circuits as described in the above referenced U.S. Pat. No. 7,290,702 and U.S. patent application Ser. No. 11/509,315. "Shopping terminals" are disclosed in U.S. Pat. No. 7,461,012 and video interphones systems are disclosed in U.S. Pat. Nos. 5,923,363, 6,603,842 and 6,940,957 and are also incorporated herein by reference.

In the following description and the claims the term "live AC" refers to the "hot line" of the AC power or mains, as oppose to the neutral line of the AC power or mains.

In the following description and the claims the term "load" refers to an appliance such as light fixture or other power appliance that is connected between the neutral line and the live AC line via an on-off switch or via a current sensor.

In the following description and the claims the term "lightguide" is a term used by Toray Industries Ltd. of Japan for marketing its Plastic Optical Fiber known as POF, having large core diameter for propagating more light. POF or lightguide attenuation is lowest at 650 nm, or the red region of the visual light. When used in the following descriptions and in the claims the term lightguide covers plastic optical fiber and any other fiber optic cable having a core of 250 microns or larger diameter, known also as multi mode or step index fiber optic cable.

In the following description and the claims the term "optical transmitter" refers to an LED, laser or other optical emitting devices that transform electric signals into IR or visual light signals or both.

In the following description and the claims the term "transmitting IR" or "IR signal" refers to IR signal emission from an optical transmitter, in air such as from hand held remote control or from an IR repeater.

In the following description and the claims the term "optical signal" refers to electromagnetic radiated signals within the UV spectrum, visual spectrum and the IR spectrum propagated via lightguide and/or fiber optic cable.

In the following description and the claims the term "optical receiver" refers to photo diode, Pin diode, photo transistor or other photo detectors for receiving IR or visual light signals and converting them into electrical signals. Optical receiver also refers to photovoltaic cells that transform visual light or IR into electric charge.

In the following description and the claims the term "receiving IR" or "IR signal" refers to the receiving of IR in air in line of sight, such as from an hand held IR remote control, or via IR repeater.

In the following description and the claims the term "optical transceiver" refers to a combined optical transmitter and optical receiver accessed through a combined access of a semiconductor package with direct optical links to a single fiber optic or lightguide cable for propagating bidirectional or two way optical signal, or via two accesses attached to or comprising an optical prism or other optical structure such as half mirror, lens or a filter for propagating two way optical signals through a single lightguide or fiber optic cable by deflecting, directing or filtering a received optical signal to the receiver and allowing the transmitted optical signal to pass into the optical medium cable. The term optical transceiver also applies to separate transmitter and receiver for propagating bidirectional or two way optical signals via dual cores contained in one lightguide optical fiber cable and/or via two optical lightguides or fiber optic cables each with a single core and/or to propagating two way or bidirectional IR signal in air.

In the following description and the claims the term "wireless transceiver" covers all type of RF transceiver and IR transceiver for propagating and receiving IR signals in air, including IR transceiver combining IR TX and IR RX as separate devices.

In the following description and the claims the term "transceiver" covers all type of transceivers including RF transceiver, IR signal transceiver and optical transceiver.

In the following description and the claims the term "AC switching device" or "AC device" or "AC powered device" refers to a remotely controlled AC power devices, for operating AC appliances via semiconductor or mechanical contacts relay and remotely operated mechanical relay for operating for example AC powered motors, and further include current sensors and AC outlets and combinations thereof, the term AC device is characterized by being powered by AC power and/or is connected in series with an appliance, such as light fixture, directly or non directly to the live AC line and remotely operated in air by IR or RF and/or via optical signals comprising visual light and/or IR signals through lightguides or fiber optic cables.

Even though only IR or only visual light may be recited in the following descriptions and the claims, the term "IR" and the "visual light" propagated via lightguide or fiber optic cable refers to both unless specifically so restricted. The term IR or visual light is used alternately and should not be restrictive to propagating signals via the lightguide to the one or the other.

In the following description and the claims the term "wireless" refers to all the signals including IR and RF signals propagated in air.

In the following description and the claims the term "low voltage device" and/or "low voltage control device" and/or "command converter" refers to a control device powered by low AC or DC voltage such as 12V DC for communicating via IR in air or optical signals via lightguide with the AC devices and include one or plurality of optical transceivers and attachment facilities for attaching and securing the one or more lightguides for communicating one way or two way or bidirectional.

In the following description and the claims the term "current sensor receiver" refers to a low voltage device for receiving optical signal via lightguide or wireless signal in air pertaining a current drain data from an AC powered current sensor device detecting the AC current drained through an AC power wire by induction or by magnetic hall sensing or other current sensing methods, such as disclosed in above referenced U.S. Pat. Nos. 7,639,907, 7,649,727 and 7,864,500 and in the referenced applications for communicating the current drain or status to the system controller.

In the following description and the claims the term gang as referenced to an electrical box or a wall plate is a reference to a space or area or both used or utilized for a single standard or common size wiring device, in the US it is known a 2"×4" and in Europe it is about 60 mm round or square box. When the term is for example to dual gang or triple gang it is a reference to a box and a wall plate for covering a dual or triple width or height and commensurating with the commonly available wiring devices sizes included therein.

In the following description and the claims the term "complimentary joint" or "complimentary joints" refers to the terminals, pins and wire pigtails provided in the AC devices for attaching the AC devices to the screw terminals and/or to the snap-in terminals of the wiring device.

In the following description and the claims the terms lightguide pigtail or short cut lightguide refer to the short lightguide(s) linking the AC device to the wiring device comprising AC outlets with sockets including optoport.

In the following description and the claims the term optoport refers to an optical access of an optical transmitter, optical receiver or optical transceiver to be optically accessed or linked via lightguide, or to a cut terminated lightguide surface provided for interlinking two terminated cut lightguides surfaces.

The AC device for introducing into an electrical box a joined device and other objects of the present invention are attained by attaching an AC switching device including a semiconductor SPDT switch or an SPDT relay controlled via a lightguide or fiber optic cable to a manual AC SPDT switch or by attaching the AC device to the switch's electrical box for attaching to the manual AC switch via pigtails and control the combined or joined SPDT relay and SPDT switch by communicating one or two way optical signals via the lightguide or fiber optic cable, including commands to operate the AC switching device, and receive in return a confirmation such as the AC current drain from the AC device or statuses of the connected electrical appliances, such as on-off status signals from the appliances.

The status can be generated in response to a received command to operate, or in response to an inquiry command (a request for status data) including a reply on the basis of the current drain as measured by the sensor, thereby providing error free remote controlling of the electrical home appliances and error free real time current consumption data.

The solution provided by the present invention, similar to the solution in the referenced pending US applications and patents, is to install a combination of an add-on wireless and/or lightguide operated AC relays that include mechanical or semiconductor SPDT relays and current sensors, packaged or encapsulated with a single or a plurality of transceivers and accesses for a single lightguide or a plurality of lightguides (in-out cascading) into an enclosure that is designed and structured to be attached or physically joined, with a selected popular manually activated SPDT or DPDT switch, for installation into standard single gang or other individual standard size electrical box and not into adjacent or distant boxes, and be hidden behind the manual switch or decoratively pleasing on the side of the manual switch within the standard single gang or multi gang electrical box size.

The detailed circuits and block diagrams of the SPDT relays including the IR or RF receiver and transmitter or transceivers and of the AC current sensor and of the circuits for the lightguide or fiber optic cable including the propagating of one or two way IR, RF or visual light communication signals between the AC relays and the low voltage IR or RF propagating devices, including lightguide converter are disclosed in the referenced US patents and applications and are not repeated here.

Because, the light guide and/or the fiber optic cable are fire retardant and perfect insulators, they can be mingled and mixed with AC wires in conduits and be attached to the AC switching device or the AC current sensor inside the same electrical box. By this arrangement it is possible to power the control circuit of the AC switching device by the AC power and propagate RF or IR communication signal in air or visual light signal via the lightguide to operate the AC switching device and the AC current sensor.

The method of combining packaged AC relay devices including current sensor to an existing standard electrical switches, introduces several major advantages; one is the lowering of the overall cost of the switches, because standard low cost, mass produced switches can be used. The second advantage is that the manual actuating of the commonly used switches is all that it takes to operate the switch (the way the switches are operated presently) with the present invention provides the ability to operate the switches remotely, in parallel by wireless remote control units, keypads, dedicated controller, video interphone monitor and via the Internet or mobile phones or iPad.

These added advantages are the other objects of present invention, attained in total harmony and with no conflict between the manual and remote switching operation as described in the referenced US patents and applications.

The pending US applications teach the use of two types of switches for AC appliances and light fixture, namely a single pole-double throw (SPDT) switches for on-off switching of a given appliance such as used to switch light fixture from two separate positions. In instances were three or more switches are needed to switch on-off the same light fixture, another type of dual pole-dual throw (DPDT) switches are used and are connected in a given straight-cross configuration in between the two SPDT switches described above. The DPDT switches and the DPDT relays are also known as "reversing" or 4 way switches or relays.

Accordingly, another of the objects of the present invention is to attach a lightguide to an IR controlled SPDT relay connected to one of an SPDT and DPDT light switch for operating a light fixture or other electrical appliance via one or several manual switches in cascade. Thereby maintaining the operation via a "commonly used" manual switch and provide the conveniences and efficiency of remote switching via the wireless or lightguide controlled SPDT relay connected to the one or several switches in a given configuration.

Yet another object of the present invention is to attach a wireless or lightguide operated DPDT relay for switching on-off light fixture or other electrical appliance in a system connected to two manual SPDT switch and to a more comprehensive switching setup that includes two SPDT and one or more DPDT switches.

The IR or RF receiver and transmitter of the AC switch device, including the AC current sensor through which the power is fed, for example, to a television receiver, transmits to the dedicated home automation controller, the video interphone or the shopping terminal, via the fiber optic or lightguide cable and through the disclosed IR or RF receiver or the IR or RF repeater, in return to a power-on command to the television receiver, a reply that the power is now on, thereby updating the home automation controller, or said video interphone or the shopping terminal with the television "on status", or "off status" if the command was to switch off the television.

The reference to home automation controller hereafter is to a panel device with control keys or touch screen and circuits similar to the video interphone and/or the shopping terminal disclosed in the pending US applications.

BRIEF DESCRIPTION OF THE DRAWINGS

The foregoing and other objects and features of the present invention will become apparent from the following description of the preferred embodiments of the invention with reference to the accompanying drawings, in which:

FIGS. 7A and 7B are illustration of the AC switching device including dual accesses for cascading lightguides of the preferred embodiment, for installation and attachment into standard single gang US electrical box for connection to a standard SPDT or DPDT switch;

FIGS. 11A and 11B are illustrations of the AC power outlets of FIGS. 10B and 10C for connections to an AC device via power line and lightguide pigtails with the AC device includes holders for attachment to the wall box.

DETAILED DESCRIPTION OF THE PREFERRED EMBODIMENTS

Figure 9A:
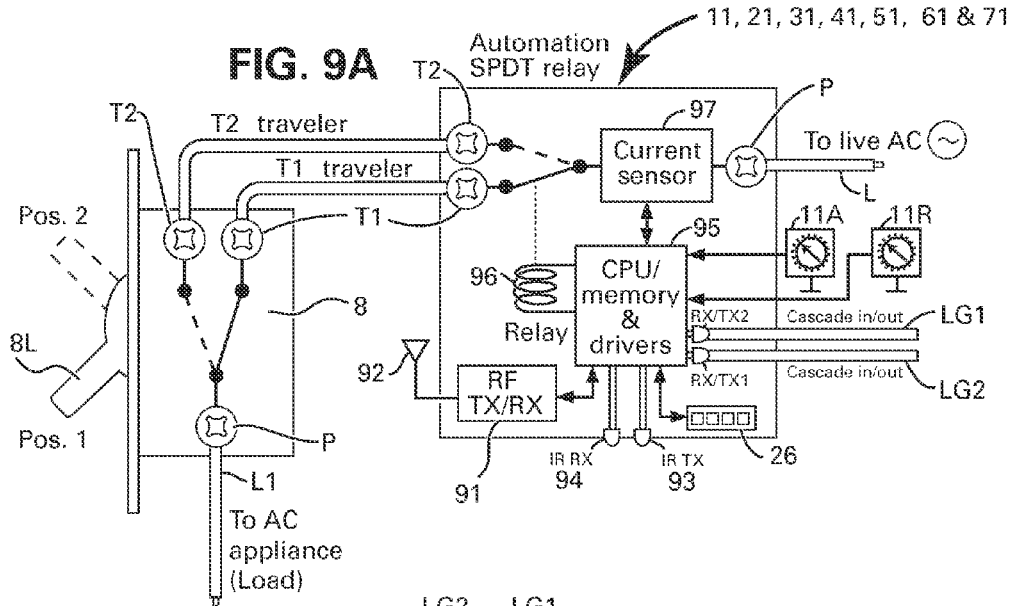
FIG. 9A is a conceptual electric block diagram of the referenced US patents and application disclosed above, depicting the circuits used to combine a manually actuated SPDT switch with the AC SPDT switching device, controlled wirelessly via two way IR or RF signals in air or via optical signal including visual spectrum light signal through lightguide or fiber optic cable of the present invention.

FIG. 9A shows a block diagram summarizing the on-off switching circuit for operating AC appliances such as heaters or light fixtures, manually through an SPDT switch 8 and remotely by the SPDT relay 96 of the AC switching devices 11, 21, 31, 41, 51, 61 or 71 shown in FIGS. 1A~7B. The known single pole-dual throw (SPDT) switch 8 includes a lever actuated spring contact P that enables to switch over the power from traveler terminal T1 to T2 for connecting AC power to an appliance or a load in combination with the remotely operated mechanical or semiconductor SPDT relay of the AC devices 11~71 used for home automation and disclosed in the referenced US patent and applications. The SPDT relay contacts, similar to the SPDT switch, connect or break the AC current fed to an AC appliance via the relay assembly 96 of AC switching device 11, representing hereafter each of the AC switching devices 11, 21, 31, 41, 51, 61 and 71 shown in FIGS. 1A~7B.

The combining of the SPDT switch with the SPDT relay of FIG. 9A via two traveler lines T1 or T2 for connecting the SPDT switch 8 with the SPDT relay 96 of the AC device 11, disclosed in the referenced US patents and applications is for providing two independent on-off switching of an AC appliance, remotely via any of the relays of the AC devices 11~71 and manually via the switch 8.

Figure 9B:
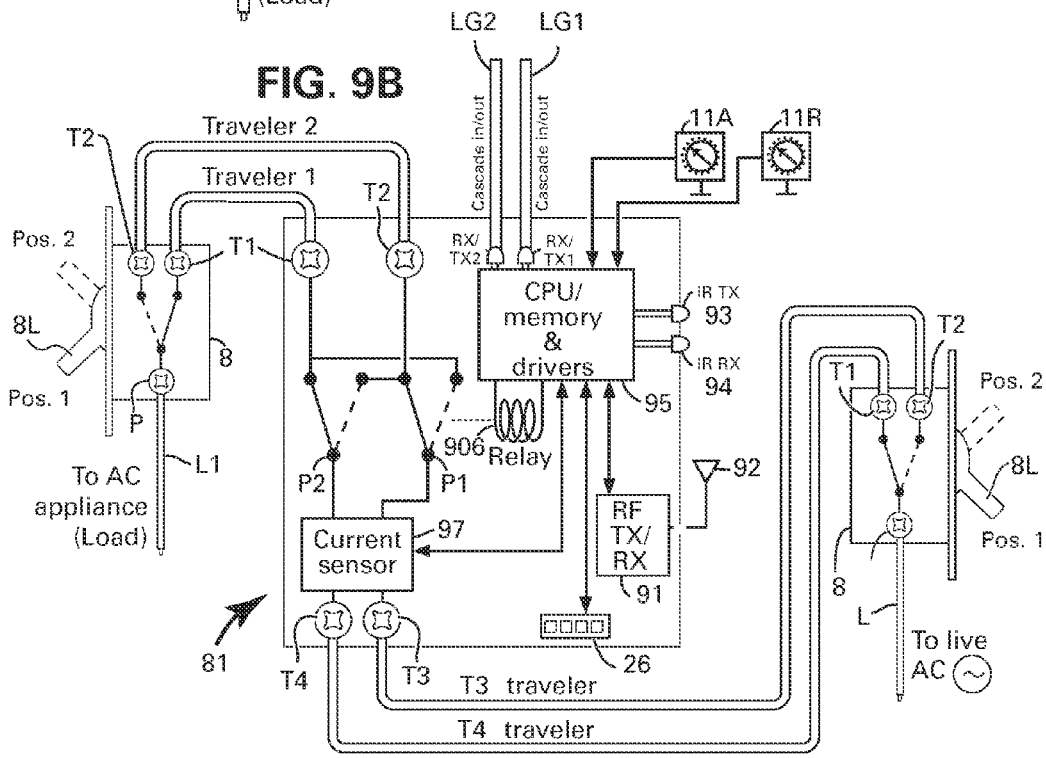
FIG. 9B is an expanded conceptual electric block diagram of FIG. 9A, depicting the circuits used to combine two manually actuated SPDT switches with the AC DPDT switching device of the home automation system of the present invention.

The switching circuits of FIG. 9B illustrates how it is possible to switch a given appliance on-off remotely via the DPDT relay 906 of the AC device 81 and via two manual SPDT on-off switches 8 and via a n number of cascading DPDT switches, not shown here but are disclosed in the referenced US patents and applications, the content of which are incorporated herein by reference. The known Dual Pole-Dual Throw (DPDT) switches and relays, connected in a cascaded traveler chain, cross or connect the travelers in straight lines. As disclosed in the US patents and applications the switch over from straight to cross of each DPDT switch enables n number of DPDT switches to be connected in the cascading circuit for manually switching the electrical appliance on-off, independently by any one of the DPDT switches in the line, and/or remotely via the disclosed DPDT or SPDT relays.

The remote switching of a cascaded traveler line however presents a reliability issue, wherein for error free remote switching of an appliance it is necessary to know the appliance operating status. It is necessary to know if the appliance power is on or off before commanding the relay to switch over. Without appliance status, the reversing of an SPDT or DPDT relay may switch the appliance power opposite of the intended command. For example, not knowing that a heater is switched off, commanding the heater relay to switch off may switch the heater on. It is possible to identify if an illuminator is lit or not on the basis, for example, of a commands fed to a driver circuit of a remotely operated SPST (Single Pole Single Throw) relay. But it is not possible to rely on a relay status when SPDT or DPDT relays are connected to an SPDT or DPDT manual switches, that are operated manually at random.

Further, for an SPDT relay control to become truly reliable it is necessary to feed a returned confirmation or data pertaining to the current drain or the on-off status of the AC appliance, propagated from the appliance to the controller. This mandate a two way or bidirectional communications, control commands to the AC power relays or the appliance itself and a returned confirmations, status or power current drain data from the appliances to the controller. The need for feeding current drain or power consumption data to the power stations are the core topic and the main objectives for the home automation considerations and the debates around the world held presently on the subject of signal or data connectivity and the smart grid programs.

The pending US applications disclose bidirectional IR and RF communications (in air), and visual light communications via lightguide or fiber optic cable for remotely operating appliances including the receiving of a returned data. Even though wireless communications are perceived to be simple, they are not very reliable, for example, movements or placement of obstructing objects within a room may obstruct the line of sight of an IR remote on-off command to a given appliances, including a command from an IR remote control repeater disclosed in the referenced patents and applications. The appliance returned confirmation and/or the on or off command itself may become obstructed and unreliable. RF may transmit and receive erroneously by invading to and from other residences and/or the RF signals do not necessarily cover the whole residences and commands or returned data are not communicated or do not reach their destinations as intended. RF network for covering many appliances and AC outlets of a residence require extensive, complex and accurate addressing that are far beyond the electrical installers training and knowhow.

The reliability issue relating to the unknown state of the SPDT switches 8 shown in FIGS. 9A and 9B making the on or off state of either the switch lever 8L and/or the relay's poles P and P1/P2 unclear. This is why the positions of the levers 8L shown in FIGS. 9A and 9B are not termed on or off, but as position 1 (Pos.1) and position 2 (Pos.2). The inability to have an accurate on-off state of either the SPDT or the DPDT switch and the relay driver 96 shown in FIGS. 9A and 9B presents a system reliability problem. The reason for this is the impossibility for the AC device 11 or 81 to identify the poles P and P1/P2 of the switch or switches 8 Pos.1 or Pos.2 statuses.

The solutions for providing a reliable on-off status to a dedicated controller or to the video interphone or to the shopping terminal that control the AC devices, the electrical switches and the AC outlets of the home automation are disclosed in the referenced US patents and applications, namely the introduction of the current sensor 97. The current sensor 97, be it current sensor by induction, magnetic hall sensing circuit, or any of other known current sensing circuits and methods, identifies in real time the appliance status for feeding an optical signal containing data pertaining the status of the appliance via lightguides or IR and/or RF signals. This data includes the verifying of the current drain, and thus enabling the controller to positively switch on and off the appliance. Moreover it provides the base for the residences, offices or other businesses or organizations to report their real time current drain or power consumption to the power station's smart grid.

The DC power for the relay 96 or 906, the CPU 95 and other internal circuits can use a residual rectified AC power by tapping on the residual voltage or current drain between live AC line and the load, using circuits disclosed in the referenced US patent and applications or any other known switching power supply circuits for the low DC current needed or the use of low DC current analog regulators.

As explained in the referenced US patents and applications the reason for not connecting the AC neutral line to the AC device is the intent to connect the AC switching device through the commonly employed AC power wiring as used for connecting AC switches. Since the currently installed wiring use only live AC and load lines, i.e., only two wires are commonly found in the conduits and in the wall boxes, the intent was to provide devices that operated with the commonly existing two wires for lighting and other appliances with no change. The DC powering circuits for such common wiring however are more complex, less efficient, require compromises and are costlier.

On the other hand, the existing rules, codes and regulations of all known electrical wiring permit unrestricted introduction of AC neutral line into the conduit and any of the AC electrical wall boxes, including the connections of such AC neutral line to any and all AC switching and other AC devices and circuits. Moreover, considering that the present invention calls for the physical introduction of lightguide and fiber optic cables to the AC device, the simultaneous introduction of the neutral AC line with the lightguide is the most cost effective answer to provide a small size AC device for attachment to a popular AC switch of the present invention. With the neutral line in the box it is simple to introduce a well known low current DC power supply, powered by the AC power line, such as disclosed in the referenced US patents and applications.

From the above description it becomes clear that the SPDT AC switching devices of the present invention can be installed into a standard electrical AC boxes, wired in compliance with the electrical codes and rules, without any significant changes to the basic wiring of the commonly installed electrical systems and be attached to SPDT or DPDT AC switches with non compromised efficiency, low cost and simplicity.

The reference patent application Ser. Nos. 12/725,808 and 12/963,876 teach a cascaded connections of lightguides or fiber optic cables to the AC switching and other AC devices and appliances such as light fixtures. The patent application Ser. No. 12/236,656 discloses the many other variations for attaching lightguide and fiber optic cable to optical accesses. The lightguide cables ends are terminated by a sharp guillotine cutter for attachment to the optical accesses, disclosed as one way or unidirectional and two way or bidirectional and combinations thereof.

From the above summary and explanation including the referenced US patents and applications it is clear that AC switching devices with or without current sensors can be controlled via a cascading chain of optical signals through the lightguides or fiber optic cables, and by IR adjusted to be in line of sight and/or by wireless RF signals.

From the teaching of the referenced US patents and applications it also become clear that the AC devices such as current sensors or AC switching devices or AC outlets can be set with address pertaining the room or zone of the premises and the particulars of the appliance, via setting switches and/or via downloading such particulars and address into a memory included the AC device. This includes the downloading via RF signals, IR in air signals and directly via optical signal through the lightguide or the fiber optic cable and via hand held device into the one or more lightguide optoports of the AC device.

The difference between the AC devices of the present invention and the disclosed teaching in the referenced US patents and application is in the physical structure of the AC devices, the method to attach the AC devices to the many given popular SPDT or DPDT switches and/or into standard electrical boxes for installing such AC devices behind the popular SPDT or DPDT switches, or side by side with the switches within a single box known also as single gang box as explained further below.

Figure 1A:
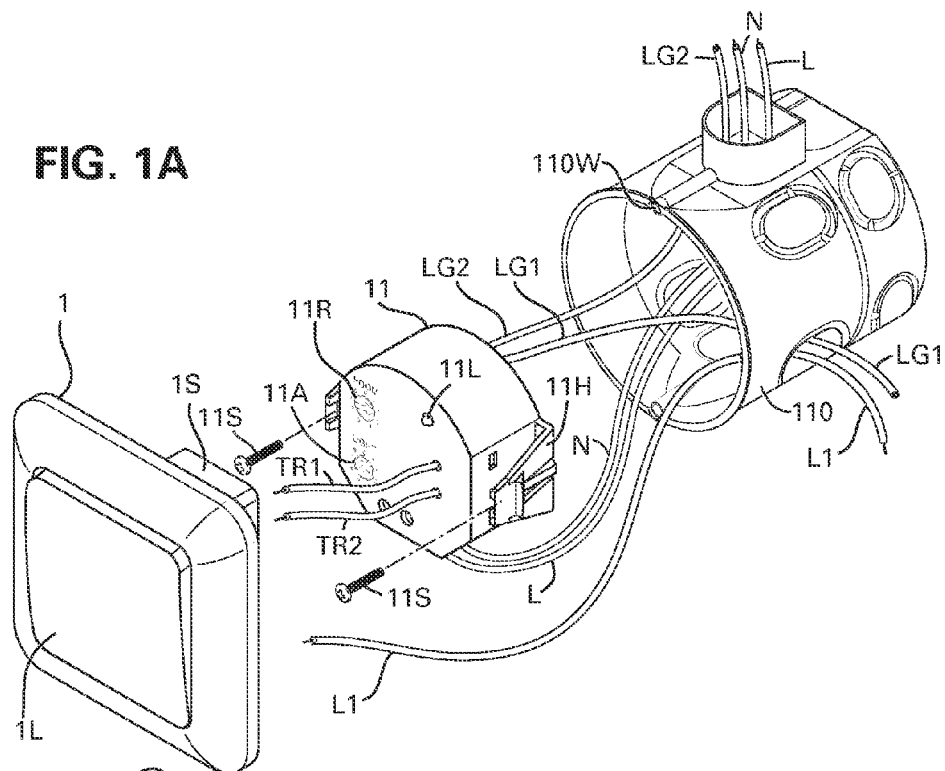
FIGS. 1A and 1B are illustration of the SPDT AC switching device including dual accesses for cascading lightguides of the preferred embodiment, for installation and attachment into standard European electrical box for connection to a standard AC SPDT switch.

FIG. 1A illustrates the front view of a typical European AC light switch assembly 1 comprising the switch 1S, its cover or frame 1F and its push knob or lever 1L. It further illustrates the AC SPDT switching device 11 and a standard wall box 110 used for mounting electrical wiring devices, such as the shown switch or an outlet (not shown). The round wall box is a standard single unit electrical box, termed hereafter as a single gang, used in most of the European countries and other countries, such as in the Middle East.

Figure 1B:
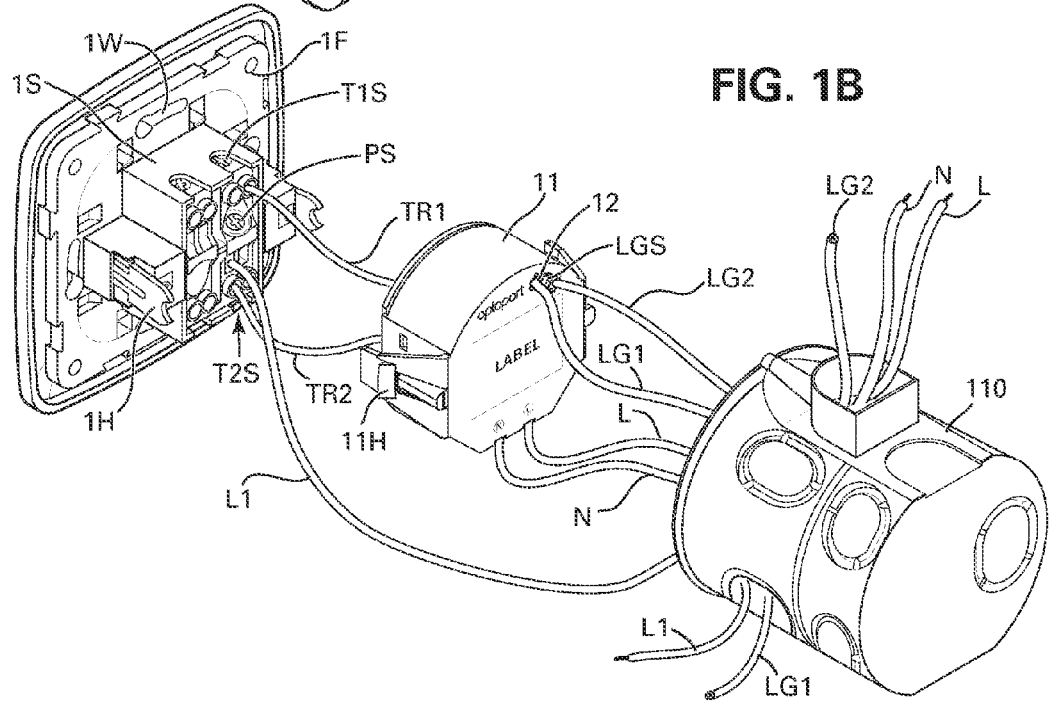

FIG. 1B illustrates the rear view of the switch assembly 1, the SPDT switching device 11 and the standard single gang wall box 110. Both FIGS. 1A and 1B show the wiring between the AC switching device 11 and the switch 1S including the two cascading lightguide LG1 and LG2.

The SPDT switch 1S shown uses screw terminals for the two travelers T1S and T2S and the pole PS for the load wire L1, shown in FIG. 1B. The AC switching device 11 is structured with two traveler pigtails TR1 and TR2 shown in FIG. 1B for direct connection to the traveler terminals T1S and T2S referred to in FIG. 1A above. The load wire L1 connected to the appliance at its end (not shown) through the wall box 110 connects to the screw terminal PS of the pole P directly.

The live power line wire L and the neutral line N connect to the power terminals L and N of the AC switching device 11 to complete the electrical connections of the switch 1S and the AC switching device 11 into the power wiring system and the load shown in FIG. 9A. The neutral wire N is not shown in FIG. 9A or 9B because the introduction of the neutral wire is for providing AC power source for the low current DC power supply circuit inside the AC switching device 11 or 81 explained above and is not necessarily related to the appliance or the load itself.

The circuits comprising the AC switching device 11 include a mechanical SPDT AC relay or a semiconductor relay such as SPDT MOSFET switch, a CPU, the two lightguide transceivers of the optoports 12. The term optoport hereafter also refers to the holder and/or the optical access for the lightguide or fiber optic cable. The lightguide transceivers are controlled by a dedicated circuit or by the CPU for providing the cascade propagation of optical signals through the cascaded chain, wherein the dedicated circuit or the CPU are designed to respond first to the first received signal and re-propagate it via the other optoport. This enables to attach the lightguides or the fiber optic cables to any one of the two cascading optoports 12 of the device. The AC switching device 11 further includes an LED indicator 11L with its driver circuit and the shown rotary digital switches 11R and 11A for setting room and appliance identification.

FIG. 1A shows the two traveler pigtails TR1 and TR2 and the load wire L1 ready for connection with the switch 1S. FIG. 1B shows the connections made into terminals T1S, T2S and PS of the switch 1S. Also shown attached to the optoports 12 are the two lightguides LG1 and LG2. The optoports 12 provide for two way cascading and therefore, they are not specified as 1 or 2, the two optoport are identical and the LG1 or LG2 can be attached freely to either of the two optoports 12. The lightguides terminated end, cut by a sharp guillotine cutter are shown secured to the optical access of the optoports by a single screw LGS, but many other attachments structures for the lightguides or fiber optic cables can be used, including the structures disclosed in the referenced US patents and applications, with or without screw or screws.

Figure 4A:
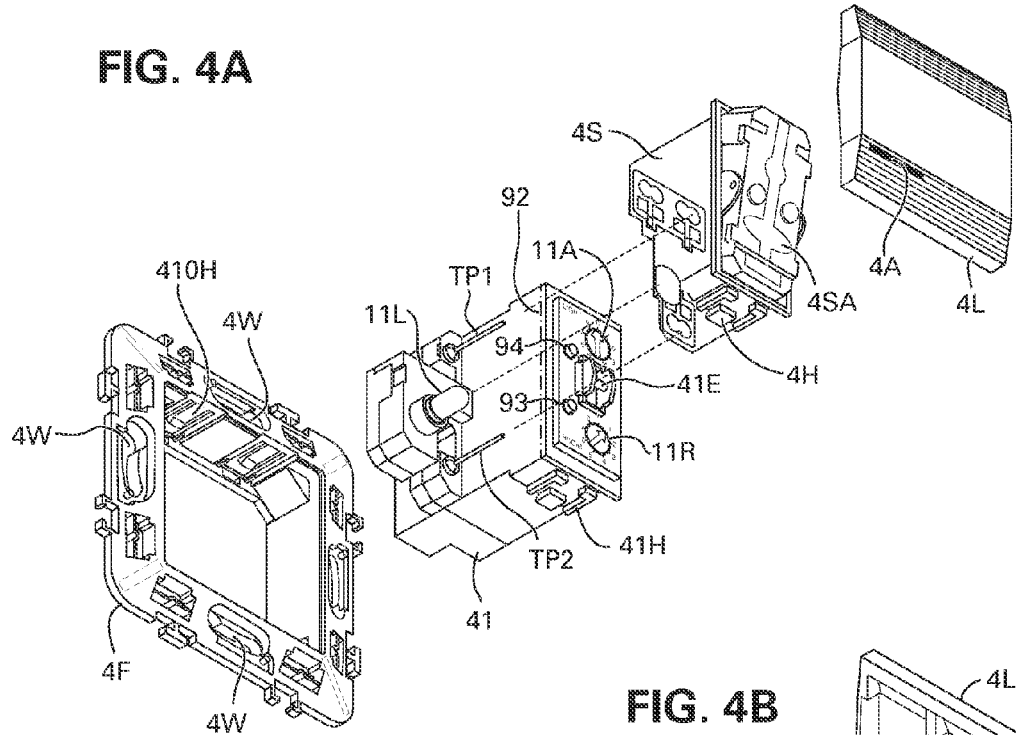
FIGS. 4A and 4B are illustration of the SPDT AC switching device including dual accesses for cascading lightguides of the preferred embodiment, for attachment by traveler pins into snap-in terminals at the back of an SPDT AC switch, such as manufactured by Legrand of France or Biticino of Italy, for installation into standard single size European electrical box.
Figure 4B:
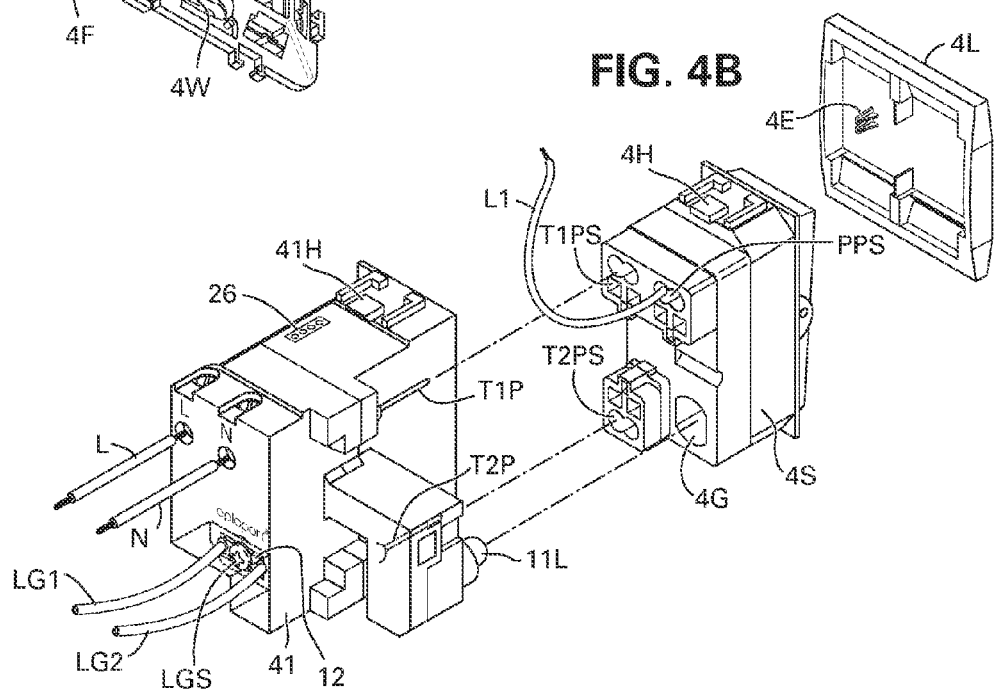
Figure 6A:
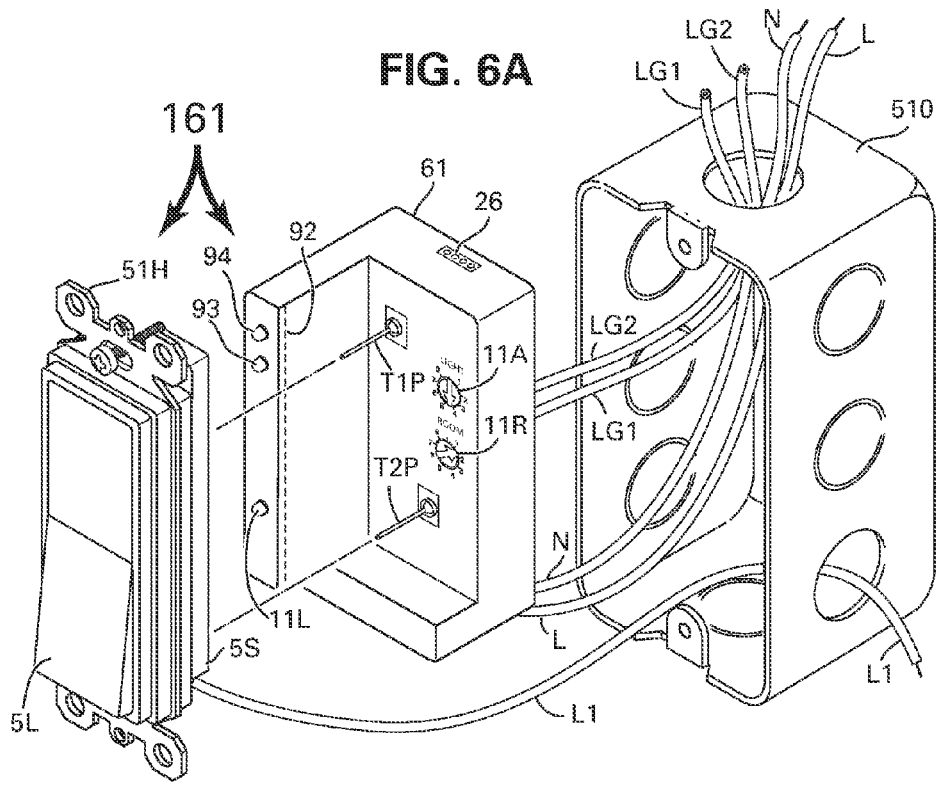
FIGS. 6A and 6B are illustration of the SPDT AC switching device including dual accesses for cascading lightguides of the preferred embodiment, for installation and attachment by traveler pins into snap-in terminals at the rear of an SPDT AC switch, such as manufactured by Leviton or Pass & Seymour, Cooper and others, for installation into standard single gang US electrical box.
Figure 6B:
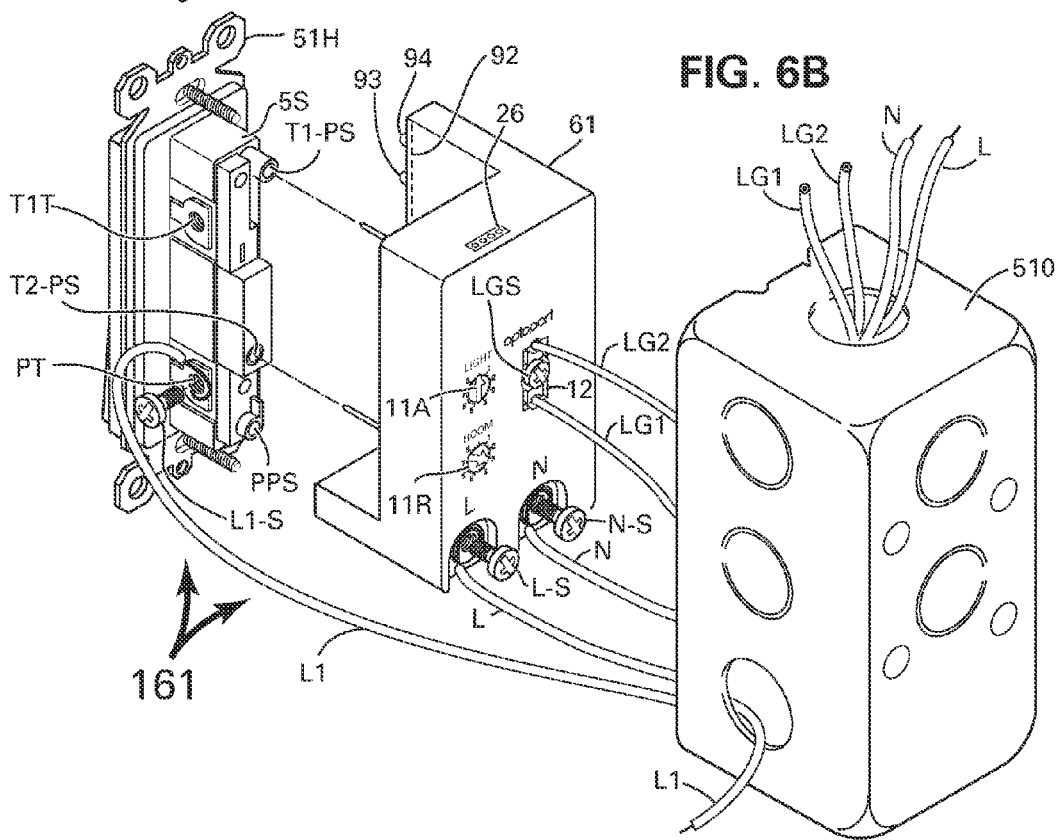

The live power wire L and the neutral wire N are connected to the AC switching device 11 into a typical European terminal block, but other type of terminals can be used such as the known snap-in or push-in terminals T1PS and T2PS provided for the different mechanical AC switches by the electrical wiring devices manufacturers such as shown in FIGS. 4A and 4B or in FIGS. 6A and 6B, or the screws with or without washers that are the traditional fasteners used for wiring devices for many years past and/or any other type of terminals and contacts.

The AC switching device or relay 11 uses two holders 11H for attachment into the round wall box 110. The two screws 11S shown in FIG. 1A are used for tightening the holders onto the inner walls of the box 110 by pushing the holder 11H outwards. The holders 11H are similar to the well known holders 1H used for securing the popular switch 1S to the round wall box 110. The wall box 110 depth is sufficient to accommodate at its rear space the AC switching device 11, that is attached via its two holder 11H to the inner walls of the box 110 and secured by the screws 11S. The switch 1 is attached via the well known holders 1H and secured to the box (not shown). Alternatively, typical European switches such as switch 1S can be secured to the box 110 via screws (not shown) through the opening slots 1W in the switch base and into the reciprocal screw holes 110W.

The shown digital rotary switches 11A and 11R are setting switches disclosed in the referenced patents and applications for setting the room or zone where the appliance or the AC switching device is located and the type of the appliance and/or its identification. The referenced patents and applications also disclose the setting of the room or zone of the premises and the appliance type and identification codes via code downloading or loading into a memory via the lightguides and via hand held loading tool, similar to an IR remote control unit, or the use of IR remote control with lightguide loading adaptor or directly to an IR receiver such as the shown IR RX 94 in FIGS. 9A and 9B.

The shown switch cover 1 and the switch lever 1L of FIGS. 1A and 1B do not provide for IR transmission but can be provided with cutouts for the IR RX 94 and IR TX 93 to be accessed via the cover 1 or the switch lever 1L, similar to the accesses 31AT and 31AR shown in the cover 31C of FIG. 3A and similar to the access 4A shown in the switch lever 4L of FIG. 4A and the transparency of the switch lever 4L to IR signals explained further below.

The LED indicator 11L shown can be constructed to illuminate via the switch lever 1L, similar to the switch lever 4L shown in FIG. 4A or it can be an indicator for the installer or the service man, programmed to indicate command received, or transmitted, or cascaded through, or to indicate failure or lack of or wrong address setting and other indication, needed for the completion of an installation or for service purposes. When the indicator is structured to illuminate the lever, it may employ two or three colors such green to indicate on state, red to indicate switch is off or yellow to indicate light program such as candle light for LED illuminator and other lighting control programs and levels. The RF antenna 92 shown in FIGS. 9A and 9B is included inside the plastic enclosure of the AC switching devices 11~81.

From FIGS. 1A and 1B and the explanation above it becomes clear that the AC switching device 11 comprising a mechanical contact SPDT relay or SPDT semiconductor relay, operated and controlled via lightguide or fiber optic cable can be installed into the rear of a standard European round wall box 110 and be introduced to a load and to an AC power system in combination with a well known popular SPDT switch 1S known also as two way switch, that is attached to the front of the wall box 110 and mounted against the wall. Transforming the popular manually actuated switch 1S into an opto-mechanical switch for remotely operating the load or the appliance via an home automation network.

Figure 2A:
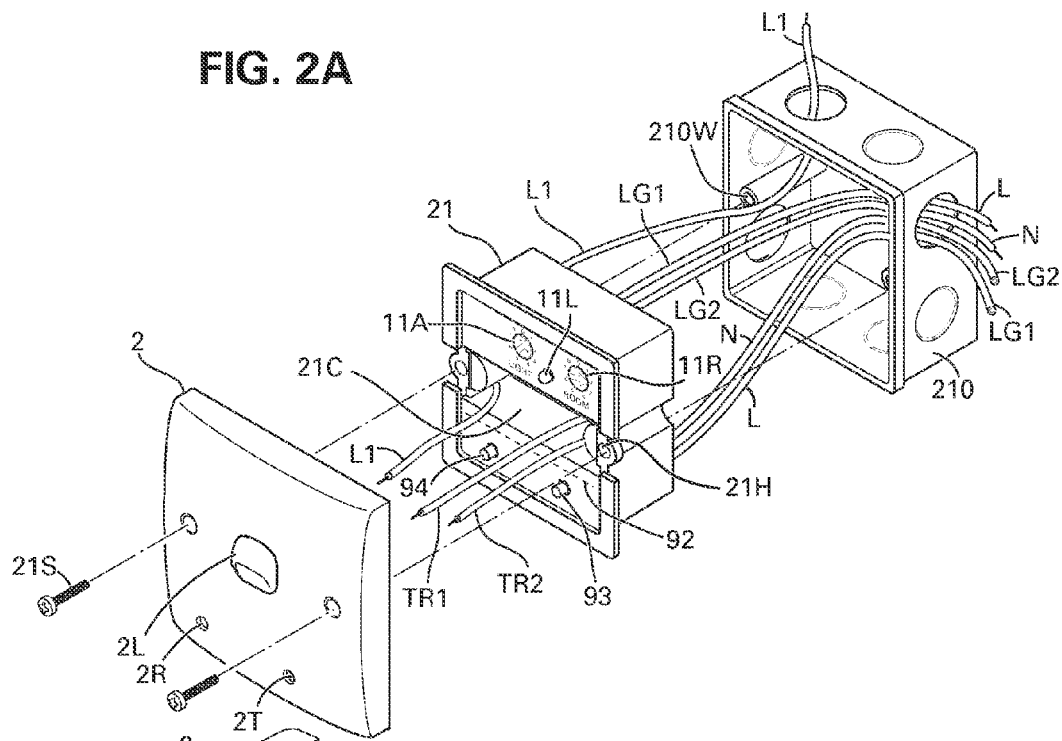
FIGS. 2A and 2B are illustration of the SPDT AC switching device including dual accesses for cascading lightguides of the preferred embodiment, for installation and attachment into standard UK and the Pacific region electrical box including Australia, China and Hong Kong for connection to a standard AC SPDT switch such as manufactured by Clipsal of Australia or Schneider of France.
Figure 2B:
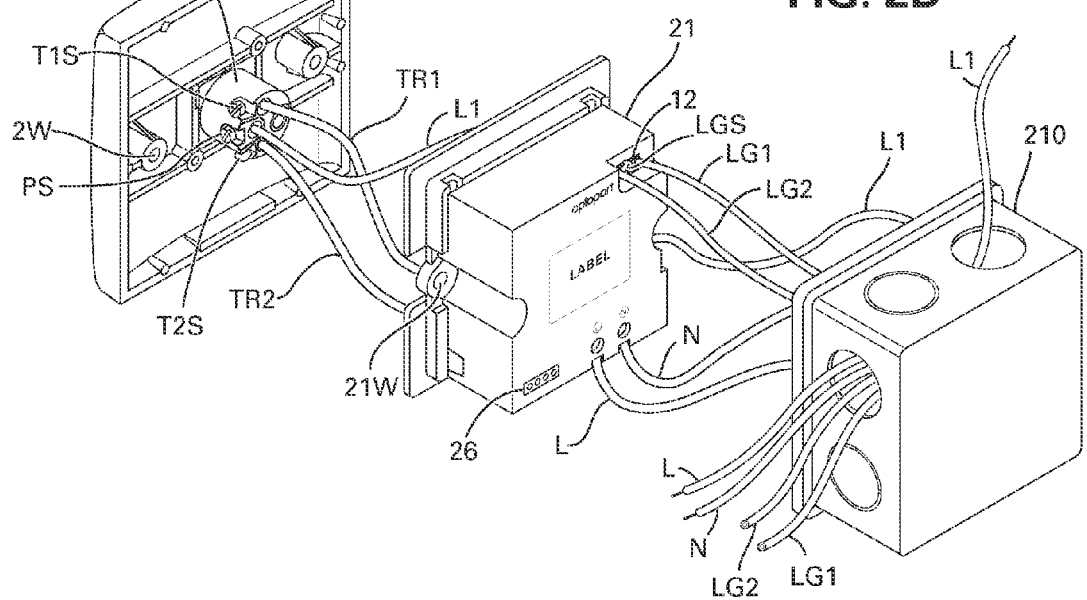

FIGS. 2A and 2b illustrate the front and rear views of a popular SPDT light switch 2S manufactured by Clipsal of Australia or Schneider of France and many other manufacturers in China, HK, New Zealand and other South Asian countries such as Singapore, Indonesia, Malaysia and Philippines in combination with AC switching device 21. The square wall box 210 is a standard single gang wall box used in the UK and all the other countries referred to above. The AC switching device 21 is electrically identical with the AC switching device 11 shown in FIGS. 1A and 1B. The difference is in the shape, size and the mounting of the AC device 21 into the wall box 210 and the cavity or space 21C provided in the center of the front of the AC device 21 for the SPDT switch 2S and the traveler pigtails TR1 and TR2 along with the load wire L1 that is fed through the wall box 210 through the side of the AC device 21 into the cavity 21C for connecting the load wire to the pole terminal PS of the switch 2S and securing it by the terminal's screw.

The two pigtail travelers TR1 and TR2 similar to the pigtails shown in FIGS. 1A and 1B are secured to two traveler terminals T1S and T2S. The front cover 2 supports the switch 2S using the two screws 21S for attaching the cover 2 with the switch 2S through the AC device mounting holes 21H to the wall box 210. Otherwise all the connections including the attachment of lightguides LG1 and LG2, the live line L and the neutral line N to the AC device 21 are the same connections and attachments made to the AC device 11 of FIGS. 1A and 1B.

The room address and the appliance type and identification setting are also processed the same way via the rotary switches 11A and 11R or via downloading through the lightguides or via IR RX 94 shown in FIG. 2A. The loading can be also performed via a connector 26 for directly loading the identification and addresses by the installer via a PC or via a loader at the time of installation.

The cover 2 is shown to have optical access to the IR RX 94 or IR TX 93 shown as holes 2T and 2R, however such accesses are not necessary and are not provided for systems with no IR control. Further the referenced U.S. patent application Ser. No. 12/236,656 discloses an adjustable IR transmitter and IR receiver for adjusting the line of sight between the AC switching device or current sensor with a wall or ceiling mount IR driver or repeater for communicating in air two way IR signal through an adjusted line of sight. Such structure as disclosed in the referenced application Ser. No. 12/236,656 can be introduced for example to replace the shown fixed IR TX 93 and IR RX 94 and the opening 2R and 2T in the cover 2 can be made to match the size of an adjustable holders of the IR transmitter and receiver, providing adjusted line of sight for the two way in air IR communication.

Similarly the antenna 92 shown as dotted line is a fixed copper line, for example, of a front PCB, mounted inside the enclosure of the AC device 21. By this arrangement, it is becoming clear that the structure of the present invention provides for two way wireless communications, IR in line of sight, RF signals and/or optical signals via lightguides or fiber optic cables cascaded from one device to the other for propagating the optical signals in cascadable order. Moreover it is also clear that the addressing including the room or zone and the appliance identification can be set via simple rotary or digital switches, and/or via the lightguides, and/or via IR or RF signals, and/or via electrical signal by the installer, directly from a PC or a loading device such as hand held programmer with IR, RF and/or visual spectrum transceivers.

It is also clear that the electrical connection to the AC switching devices including the current sensing circuit 97 of FIG. 9A, is very simple and do not require expertise or a major change from the current existing wiring methods and practices.

Figure 3A:
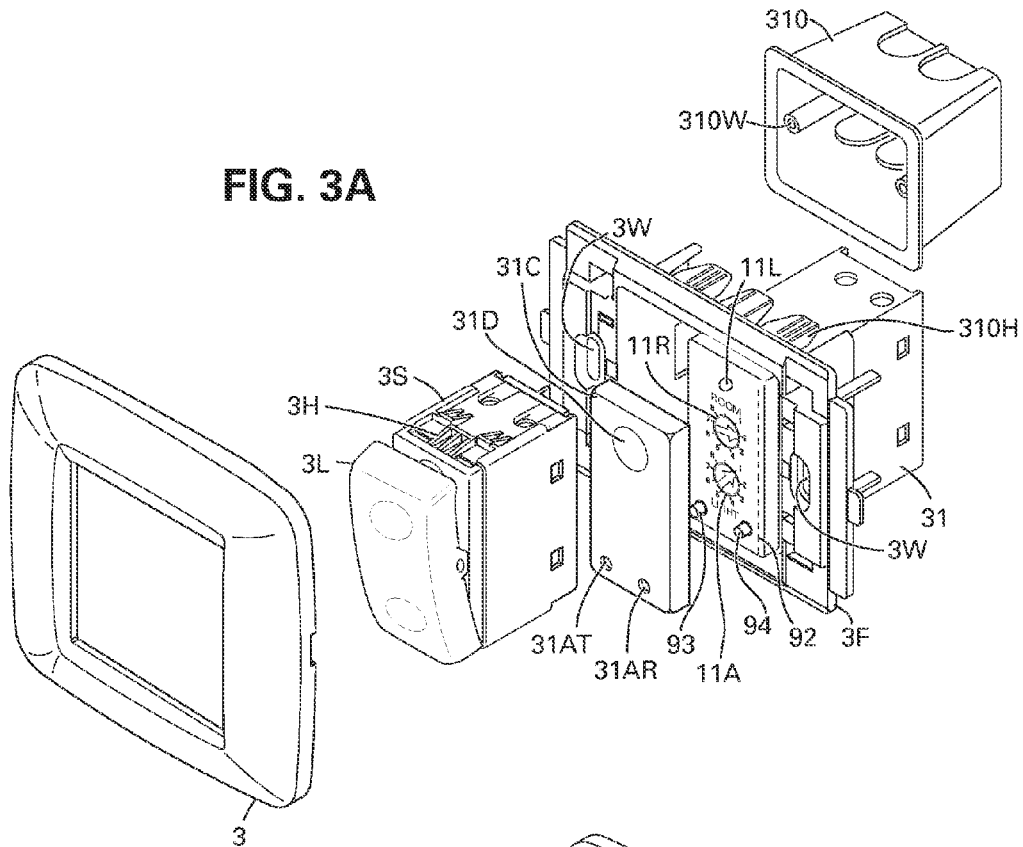
FIGS. 3A and 3B are illustration of the SPDT AC switching device including dual accesses for cascading lightguides of the preferred embodiment, for installation and attachment side by side with an SPDT AC switch, such as manufactured by Gewiss of Italy, into standard single size European electrical box.
Figure 3B:
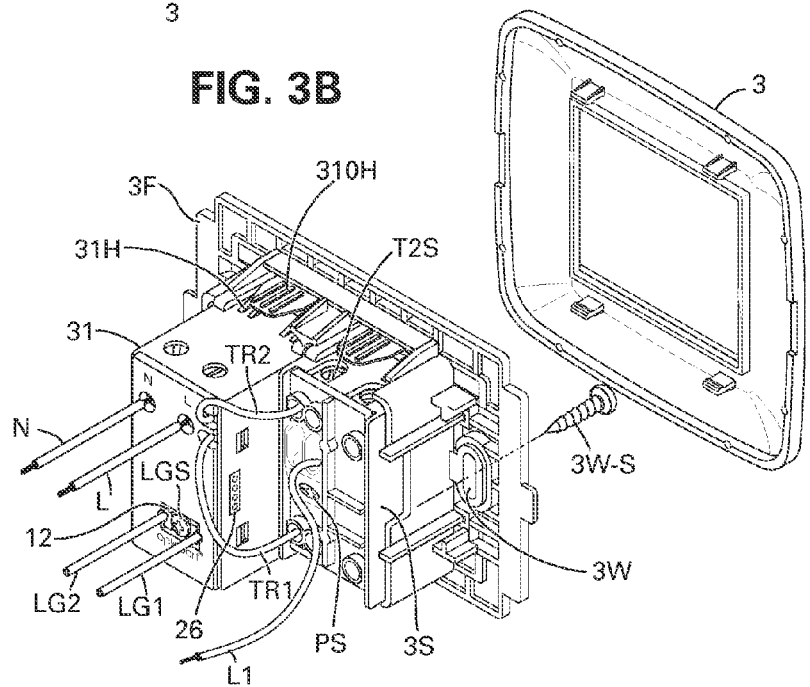

FIGS. 3A and 3B illustrate the front and rear views of a combination of a popular SPDT light switch 3S manufactured by GEWISS of Italy with the AC switching device 31 of the preferred embodiment of the present invention, mounted into a frame 3F. The frame 3F in different sizes mounts onto a standard single gang square or a rectangular multi gang electrical wall boxes 310, with the shown box 310 behind the single gang frame in FIG. 3A is drawn in a small scale of 1:2 versus the frame 3F, the switch 3S and the cover 3. The shown square frame 3F attaches to the wall box by dual screws 3W-S into the corresponding mounting studs 310W via the cutouts 3W. The switch 3S includes serrated or toothed surfaces 3H at its upper and lower sides for self locking into a corresponding notches structure 310H of the frame 3F, via a simple push-in action of the switch 3S into the frame 3F.

The shown AC switching device 31 of the present invention is also provided with the self locking serrated or toothed structures 31H at its top and bottom surfaces for self locking by the holders 310H by simple push-in insertion. The connections of the AC switching device 31 and the Gewiss SPDT switch 3S are similar to the connections shown in FIGS. 1A and 1B and described for the popular SPDT switch 1S and the AC switching device 11. This includes the pigtails TR1 and TR2 connections to terminals T1S (not shown) and T2S and the connections of the load wire L1 to the pole terminal PS of the switch 3S. The live AC line L and the neutral line N are shown attached and fastened to a typical European terminal block in the AC device 31 and the cascading lightguides LG1 and LG2 are shown attached to the optical accesses 12, secured by screw LGS, similar to the shown connections in FIGS. 1A~2B.

The IR RX 94 and the IR TX 93 are shown accessed through the front cover 31C of the AC switching device 31 made to esthetically look like the lever key 3L of the Gewiss SPDT switch 3S and include the surface 31D for indicating the illuminator or other appliance status by the LED indicator 11L. The accesses 31AT and 31AR for the IR TX and IR RX are shown for a fixed position IR transmitter 93 and receiver 94, but similar to the explanation above for providing a structure for an adjustable IR TX and IR RX into a line of sight, disclosed in U.S. application Ser. No. 12/236,656, the AC switching device or relay 31 and its cover 31C can be constructed to include such adjustable IR transmitter 93 and receiver 94. The RF antenna is shown inside the AC switch device 31 as dotted line 92 but it is a copper line of the internal PCB or can be a solid copper line near or at the front inner surface of the device 31.

FIGS. 4A and 4B illustrate the front and rear view of a combination of a popular SPDT switch 4S manufactured by Biticino of Italy and Legrand of France with the AC switching device 41 of the preferred embodiment of the present invention. The SPDT switch 4S includes similar to the Gewiss switch 3S a self locking structure 41H for mounting the switch into the frame 4F, which comprises a matching lock structures 410H for locking two switches 4S into a single gang electrical wall box, such as the box 110 of FIGS. 1A and 1B and/or the square box 310 shown in FIG. 3A.

The frame 4F mounts onto the wall box using the disclosed above screw 3W-S shown in FIG. 3B by attaching the frame 4F by the screws 3W-S through the cutouts 4W in the frame to the studs 310W of the square box 310 in FIG. 3A or to the stud 110W of the wall box 110 in FIGS. 1A and 1B. The switch 4S is structured to include snap-in wire contacts, requiring no screw or the common electrical fasteners, such as special screws with or without washers, traditionally used for such switches and outlets. The snap-in terminals T1PS, T2PS and PPS shown in FIG. 4B are for connecting the traveler wires T1, T2 and the pole wire L1 by snap-in insertion.

Shown in FIG. 4B the snap-in insertion is adapted for the traveler pins T1P and T2P constructed to match the size and pitches, for attaching the AC switching device 41 to the switch 4S by a simple snap-in, and locking the combination of the switch 4S and the device 41 together to the frame 4F. The AC switch 4S and the AC device 41 locked together can be inserted into the frame 4F as a single combine unit to instantly lock into the holders 410H of the frame via the structures 4H of the switch and 41H of the AC switching device 41.

The switch 4S shown in FIGS. 4A and 4B is provided with access 4G for illuminating or indicating the switch status onto the switch lever 4L via the light exit 4SA and the indicator slot 4A of the switch lever 4L. The switch lever 4L is structured for direct attachment to the switch 4S such that the indicator slot 4A is directly accessed to the light exit 4SA of the switch 4S.

The lever 4L is constructed of a dark transparent plastic material that passes IR signals and blocks visual light from passing, known as the black plastic cover for IR receivers in A/V appliances. The black cover is an IR pass filter and by using such material and structure the IR TX 93 and the IR RX 94 of the AC device 41 are fully accessed for two way IR signals, such as operating commands, confirmations, status and current drain reporting. The lever 4L shown in FIG. 4B includes a self locking hinge 4E to lock onto the hinge pin 41E for maintaining smooth balance toggling action of the switch lever 4L.

The RF antenna 92, shown as dotted line is a copper pattern on a PCB or a solid copper wire inside the device 41 for propagating two way RF signals. The IR RX 94 and IR TX 93 shown as fixed type can be constructed to be adjustable into a line of sight regardless of the switch lever 4L, because the switch lever is constructed of an IR transparent material for IR and therefore it does not obstruct the IR signal two way propagations.

The indicator 11L is positioned directly toward the access 4G to illuminate the lever 4L and indicate on state such as green, off state is red and special program state as explained above in orange or yellow, or with any other desired LED colors.

The lightguides LG1 and LG2 are attached to the optoports 12 and secured by the screw LGS for providing control to the combined switch 4S with the AC device 41 and confirmation from the device or the appliance including statuses and current drain data provided by the current sensor 97 shown in FIG. 9A. The load wire L1 is shown inserted into the snap-in terminal PPS of FIG. 4B with the live AC line L and the neutral AC line N are attached to the terminal of the commonly used terminal block included in the AC device 41.

The use of two cascading lightguides LG1 and LG2 is optional, a single lightguide leading from a lightguide converter or distributor disclosed in the US patents and applications and shown in FIG. 10 is all that is needed for visual light communicated signal, with the IR and RF communications may not be needed and not used. If RF or IR signals are used the lightguide may not be needed and not included or not used. For the other particulars such as setting room or zone addresses and appliances identifications via rotary digital switches 11A and 11R, loading or downloading via the lightguides, RF or IR signals including the loading via the connector 26 apply to the AC switch device or relay 41 the same as it applies to the device 21 or 11 in FIGS. 1A–2B.

The repeated showing of the two cascading lightguides being attached to the AC switching devices 11~81 is only to show the simplicity in connecting the many devices in a cascaded chain with low cost, providing secured and reliable propagation of two way signals to and from the AC switching devices and for extending the number of controlled appliances by a cascaded connection to switches and AC outlets and to the operated appliances such as LED illuminators, disclosed in the referenced patents and applications.

The shown terminals L and N for the live AC power and the neutral AC line can be snap-in terminals such as shown in the SPDT switch 4S. The addressing via the rotary switches 11A and 11R including the loading into a memory such particulars as a room Or zone and the identification of the appliance repeatedly discussed above fully apply to the combination of the AC switch 4S and the AC device 41.

Figure 5A:
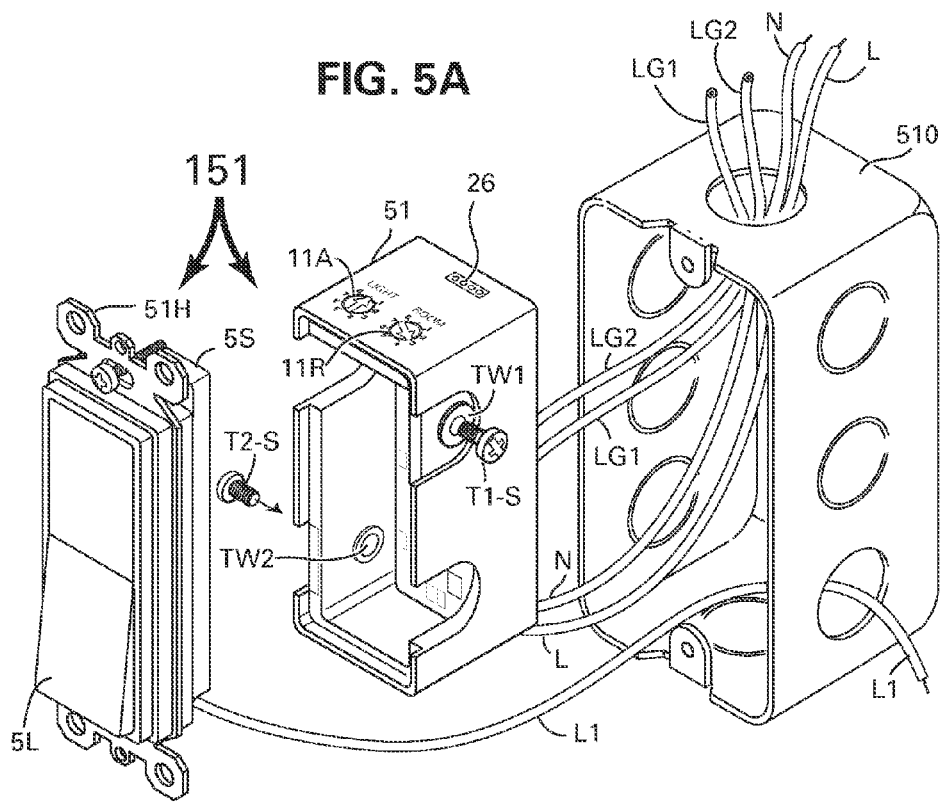
FIGS. 5A and 5B are illustration of the SPDT AC switching device including dual accesses for cascading lightguides of the preferred embodiment, for installation and attachment through the travelers terminals on the sides of an SPDT AC switch, such as manufactured by Leviton or Pass & Seymour, Cooper and others, for installation into standard single gang US electrical box.
Figure 5B:
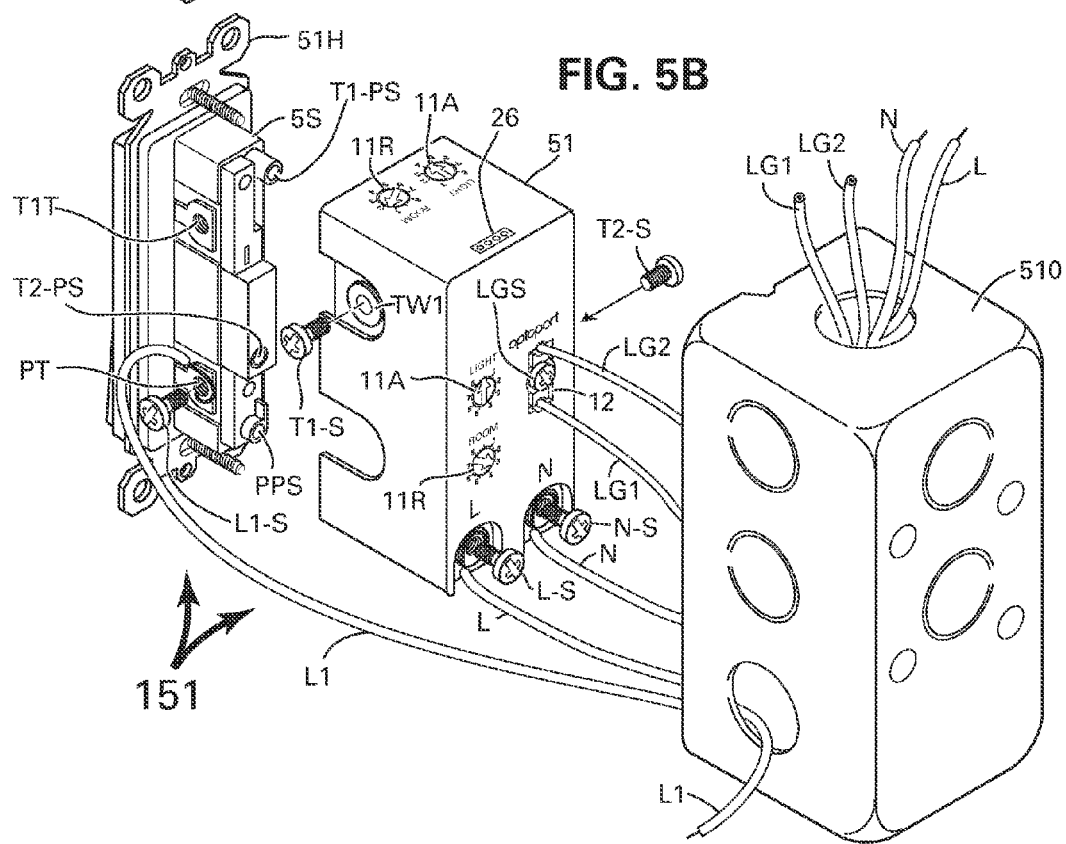

FIGS. 5A and 5B illustrate the front and the rear views of a combination of a popular SPDT switch 5S manufactured by Leviton, Pass & Seimour, Cooper and others in the US with an AC switching device 51 of the preferred embodiment of the present invention and the signal gang US electrical box 510. The shown SPDT switch 5S is provided with dual type terminals, the traditional fasteners such as screws T1-S, T2-S and P-S for attaching the traveler wires to the traveler terminals T1T, T2T (not shown) and the load wire to the pole terminal PT, along with three snap-in terminals T1PS and T2PS for the two traveler wires and PPS for the load wire L1.

FIGS. 5A and 5B illustrate the use of the terminals and screws for attaching an AC switching device 51 and FIGS. 6A and 6B illustrate the attachment of the AC switching device 61 via the snap-in pins. The traveler contacts TW1 and TW2 of the AC switching device 51 shown in FIGS. 5A and 5B are structured metal contacts having round or other shape and size to match the positions, size and shape of the travelers T1T and T2T terminals of the SPDT switch 5S, such that the two screws T1-S and T2-S will attach the structured metal contacts TW1 and TW2 of the AC device to the two traveler terminals T1T and T2T and the entire AC device 51 body to the switch 5S.

All other connections including the load wire L1 that is connected to the pole terminal PT and secured by the typical screw or fastener used for such switches, with or without washer, and the AC live line L and neutral line N, including the lightguides LG1 and LG2 attached to the optoports 12 and secured by the screw LGS are all a repeated connections explained and discussed above. Same apply to the setting of addresses via the rotary digital switches 11A and 11R and the loading via the lightguide or the optoport directly by an hand held loader or via a PC to the loading connector 26.

The shown switches 11A and 11R are repeated twice in order to illustrate the importance of the switches location. With all the shown wires and lightguides connected it is not simple to pull the assembly out from the wall box for setting the switches at the rear of the assembly. Locating the switches on top, as shown for example, will enable simpler access to the switches shown on the top side of the AC device 51 by slight pulling of the combined switch outwards.

Even though FIGS. 5A and 5B do not include or show an indicator or IR receiver and/or IR transmitter but such can be included to the AC switching device 51 similar to the shown AC switching device 61 in FIGS. 6A and 6B, which is very similar to the AC switching device 51 but includes the two traveler snap-in pins T1P and T2P for attaching the AC switching device 61 to the SPDT switch 5S via the snap-in traveler sockets T1PS and T2PS. The setting switches 11A and 11R are also shown duplicated for illustration only, to emphasize that the selected location is important for enabling easy access to the switches.

The IR TX 93, IR RX 94, the indicator 11L and the RF antenna 92 shown structured on the side to be in a depth level to match the surface of the well known front cover (not shown) of the popular switch with a cutout for the IR RX, the IR TX and the indicator 11L. All other connections and setting referred to above switch 4S and switch 5S applies. The same apply to the in line of sight adjustable IR RX and IR TX discussed repeatedly above wherein, such adjustable structure can be constructed vertically on the side of the AC switching device 61 or horizontally on top or the bottom of the switching device 61 to be aligned with the side, top or bottom of the switch front and lever 5L, when the switch is attached via its holder 51H to the wall box 510 and covered by the well known switch cover (not shown) with cutouts.

FIGS. 7A and 7B illustrate the combination of the switch 5S shown in FIGS. 5A~6B with an AC switching device 71 which is similar to the AC switching devices 51 or 61 but for attachment to the single gang wall box 510. The AC device 71 is provided with four corner holders 71H that are constructed to grip the four corners of the inner cavity of the wall box 510 when the screws 72 are tightened onto the angled corner bases 73, pushing the holders 71H outwards for tightly gripping the box.

Alternatively the AC switching device 71 is mounted to the single gang wall box 510 by two holder 75H that replace the four holder 71H and are attached to the four angled corners 73 using the screws 72. The holder 75H is attached to the flaps 512H of the box 510, sandwiched between the switch holder 51H by the screws 51S. The holder 75H can be constructed to include an adjustable link for setting the depth of the AC switching device 71 inside the wall box 510. The adjustable link 76H is shown with a locking screw 75S for adjusting its height.

The two traveler pigtails TR1 and TR2 are shown in FIG. 7B to be inserted into the travelers snap-in terminals T1PS and T2PS, but they can be attached to the screw terminals T1T and T2T instead (T2T not shown). Otherwise all other connections and references described and detailed above including the cascading lightguides or a single lightguide, and/or the IR, the RF and the direct loading or the switch setting of room or zone addresses and appliances identification all apply to the literally identical electrical and control circuit, disclosed in FIG. 9A and the explanation above.

Figure 8A:
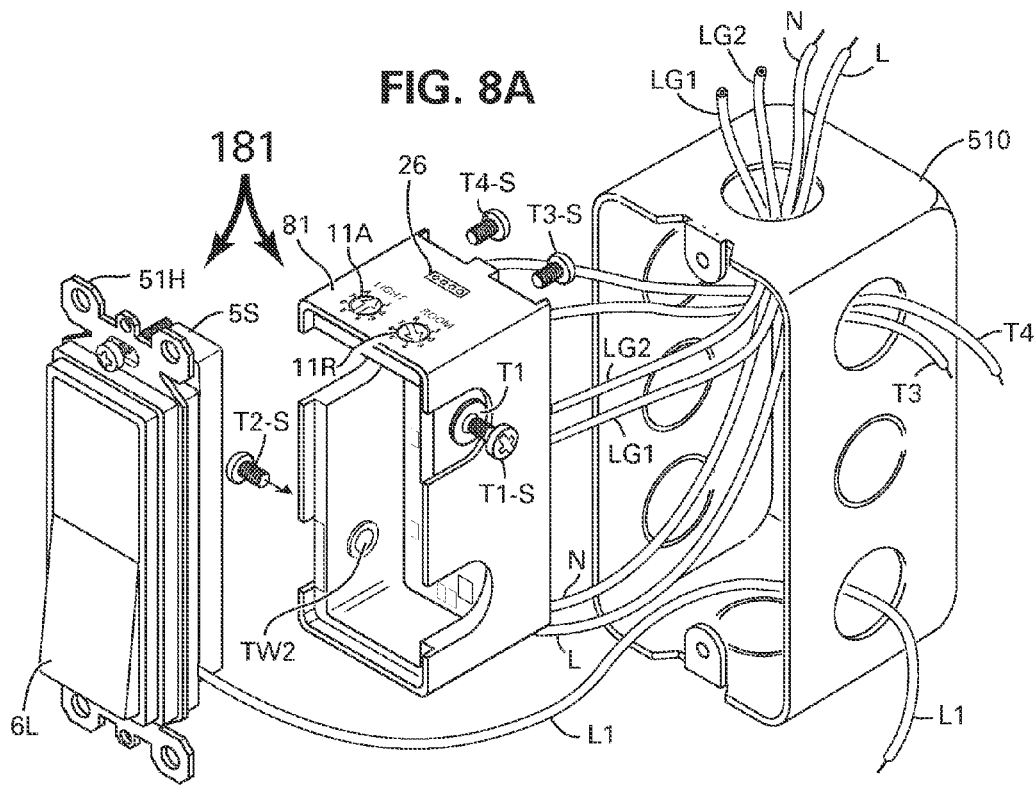
FIGS. 8A and 8B are illustration of the DPDT AC switching device including dual accesses for cascading lightguides of the preferred embodiment, for installation and attachment through the travelers terminals on the sides of an SPDT AC switch, such as manufactured by Leviton or Pass & Seymour, Cooper and others, for installation into standard single gang US electrical box.
Figure 8B:
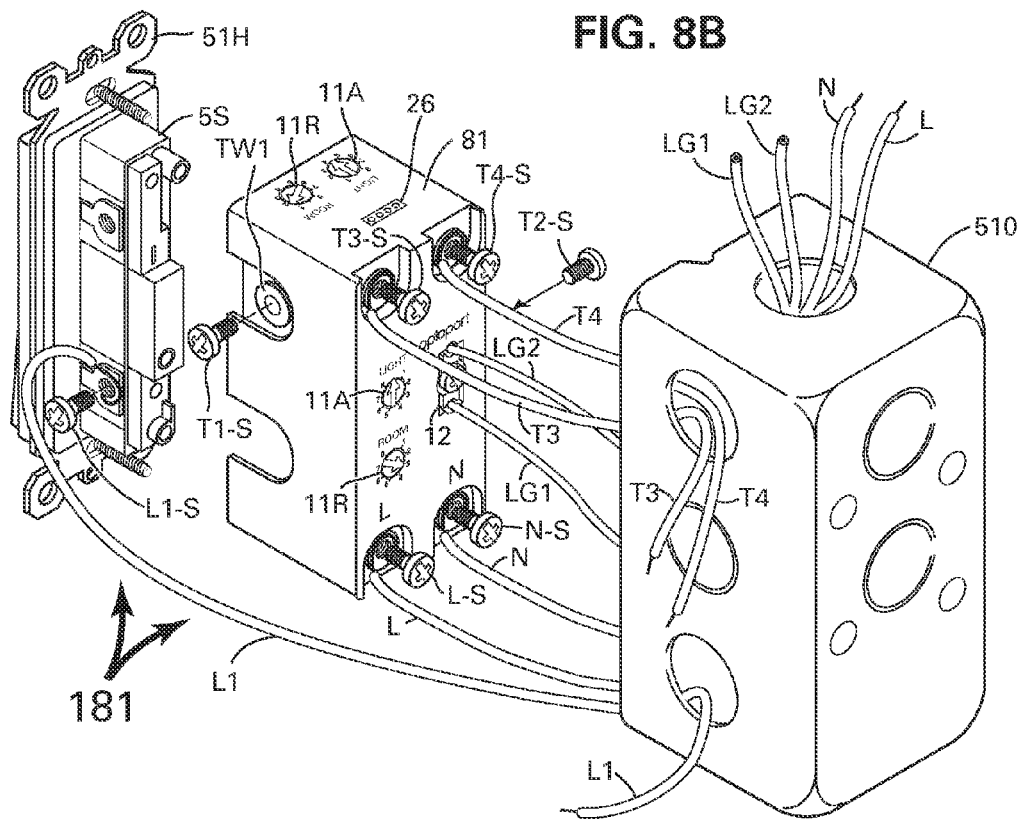

FIGS. 8A and 8B illustrate a combination of a switch 5S and a DPDT AC switching device 81. The joining of the switch 5S with the AC device 81 in FIGS. 8A and 8B is very similar to the joining of the switch 5S and the AC switching device 71 in every aspect discussed in details above, with the exception that the switching circuit of the AC device 81 is DPDT via a relay contact or semiconductor switches such as MOSFET switches connected as shown in FIG. 9B.

The T3 and T4 traveler lines are shown in FIG. 8B connected and secured to the traveler terminals via screws T3-S and T4-S, thus providing for outgoing traveler lines to another DPDT switch in cascade or directly to another SPDT switch at the other end of the switching line (not shown), similar to the circuit shown in FIG. 9B.

All other connections, setting, loading and other item disclosed above apply to the setup or combination shown in FIGS. 8A and 8B including the two way IR and RF communication and the visual light communication via the cascading or a single lightguide and the downloading connector 26. Moreover the shown DPDT AC device 81 is similar to the AC device 51 of FIGS. 5A and 5B, but it can be constructed with all facilities for attachment explained above apply for a DPDT AC device that is constructed similar to the AC device 61 shown in FIGS. 6A and 6B or to a DPDT AC device that is constructed similar to AC device 71 shown in FIGS. 7A and 7B.

From the above explanation it becomes clear that the SPDT or DPDT AC switching devices comprising semiconductor switches such as MOSFET or other semiconductor devices and mechanical relays activated by magnetic coils including control and communication circuits and current sensors can communicate two way with an home automation controller selected from a dedicated controller, video interphone monitor and shopping terminal and with array of distributors, command converter and drivers via wireless IR or RF, via visual spectrum signals through lightguide and be attached to a whole range of popular SPDT or DPDT switches and installed into a single gang or a single unit wall box and use the same area of a wall plate as used for the switch only.

The combination will be decoratively untouched because it will not change the pleasing and the convenience to operate (manually) the same way the switches are operated traditionally, but will provide the remote operation via lightguides, and in air via IR and RF including operation by hand held remote controls.

Figure 10A:
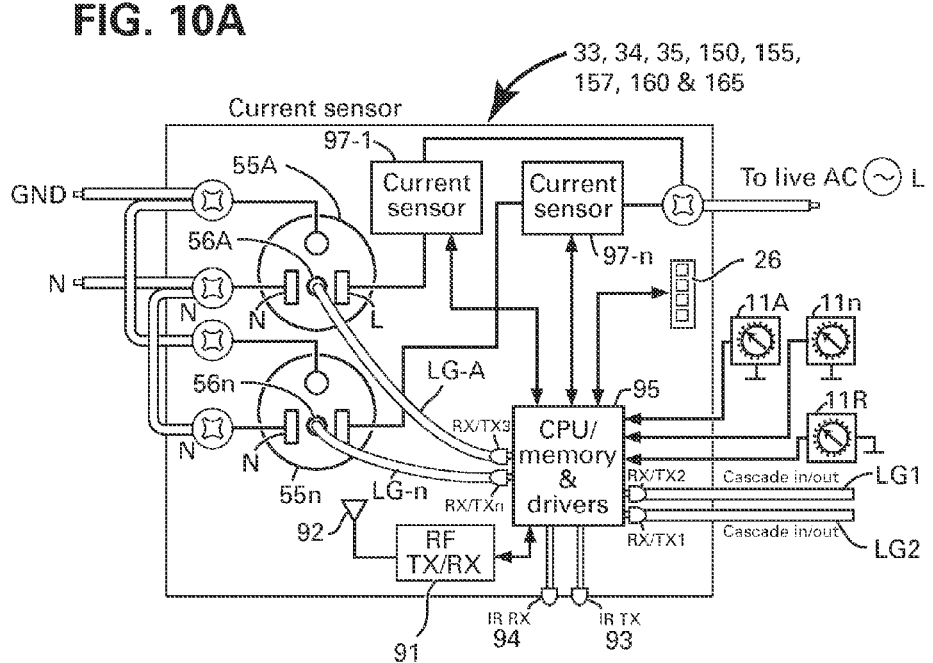
FIG. 10A is a block diagram showing the system disclosed by the US referenced patents and the application of FIG. 9A as it applies to AC outlets, including the cascading optical signal propagation and the lightguide links to the optoport of the AC sockets.

FIG. 10A is a block diagram essentially summarizing the current sensing block diagram or circuits disclosed in the referenced US patents and applications. The block diagram combines the circuits and devices of the current sensor assemblies 33, 34 and 35. The current sensors disclosed in the referenced patents and applications differ from the current sensors 33, 34 and 35 by the attachment method and the structure, similar to the attachment of the switches of the present invention explained above.

Further the block diagrams of FIG. 9A or 9B and 10A can be combined by adding the relay 96 or 906 to be controlled by the CPU 95 of the current sensor, plus the two traveler terminals T1 and T2 for the SPDT relay or the whole four traveler terminals T1~T4 for the DPDT relay. Such combination 57 provides for remotely operating an AC outlet and a switch, structured for installation as a combination 157 in FIG. 13 into a single gang box, and be covered by a single decorative cover (not shown).

The block diagram of the current sensor assemblies 33, 34 and 35 provide for attaching the current sensors of the present invention to variety of outlets with current sensor combinations 150, 155, 157, 160 and 165 as explained below and shown in FIGS. 10B~12B.

The difference between the block diagram 33, representing the three structured current sensors 33, 34 and 35, from the block diagrams 11 and 81 of FIGS. 1A and 1B is the removal of the relay and the traveler terminals, and the addition of the AC sockets 55A and 55n, including the additional RX/TX3~n for linking the optoports 56A and 56n with the CPU 96 via a short cut or a pigtail of lightguide link LGA and LGn. The use of "n" identification for the sockets 55, the optoports 56 the TX/RX and the lightguide LG are to indicate that though only two sockets 55 are included and shown in the drawings, "n number of sockets can be introduced, such as three, four, five or "n". The n also include the current sensor block such as 97-n.

The current sensor as explained above can be an induction sensor via coil, or current transformer, or magnetic hall sensor that is available in small size IC package, for example by Allegro, a division of Sanken Electric, a semiconductor manufacturer, or it can be an accurate low ohm resistor, commensurating with a given current drain range. The CPU 95 can incorporate analog to digital converter, voltage measuring circuit and a comparator circuit for evaluating the status of the appliance, for indicating via an LED the on/off status and/or for communicating the current drain and/or the power consumption of the appliance in watt units.

To provide for n sockets well known CPUs with larger number of in/out ports can be used. Same applies to a combination AC device including multi circuits, such as multi mechanical or semiconductor relays, multi current sensors and multi indicators for a combination of AC wiring devices in a multi gang box.

Figure 10B:
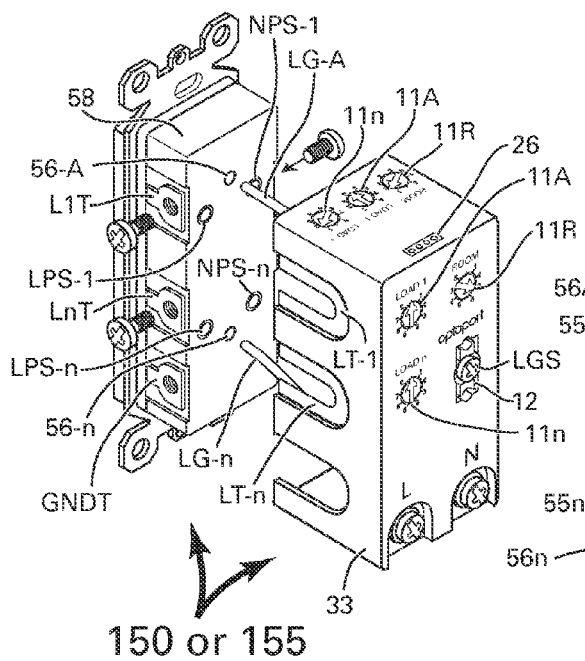
FIGS. 10B and 10C are illustrations of AC power outlets with optoports for attachment to an AC device via snap-in pins and short cut lightguides or lightguide pigtails for the optoport attachment.
Figure 10C:
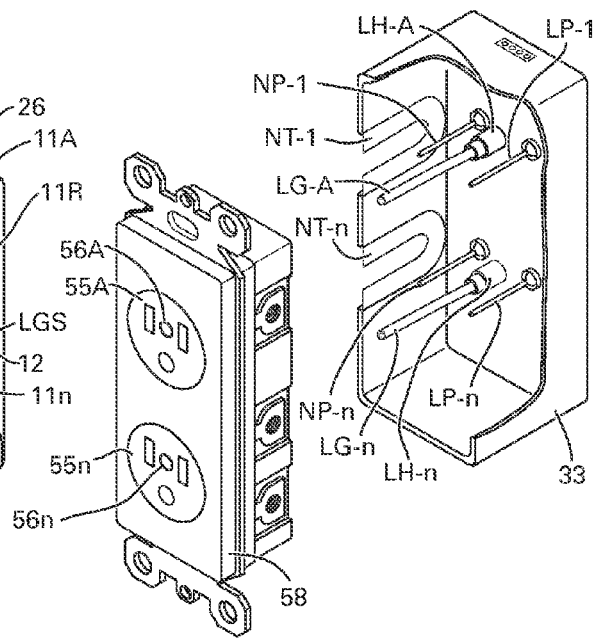

FIGS. 10B and 10C show the attachment of a popular AC outlet socket 58 for residential application, such as manufactured by Leviton and other US manufacturer of electrical wiring devices. The current techniques provide sockets for snap-in wiring shown as LPS-1, LPS-n, NPS-1 and NPS-n. LPS represents the Live Line Pin Socket and NPS the Neutral Line Pin Socket, that are connected in parallel with the traditional terminals LiT, LnT and NiT or NnT (not shown) with screws (shown but not numbered).

The socket 55A and 55n shown with optoports 56A and 56n which are not currently included in the known AC outlets. The optoports are disclosed in the referenced applications. The earthing terminal GNDT is provided for all the 3 pin power outlets. For an AC outlet with a single or a plurality of the well known 2 pin AC power socket the GND terminal GNDT is not shown and the GND wires shown in FIGS. 10A, 10B, 11A, 11B, 12A and 12B may not be used.

The current sensor assembly 33 of FIGS. 10A and 10*b* is shown with the snap-in pins LP-1 and LP-n, NP-1 and NP-n for attaching n pairs of snap-in pins to the snap in sockets LPS-1, LPS-n, NPS-1 and NPS-n (not shown). The assembly 33 is also shown with a structured terminal LT-1, LT-n, NT-1 and NTn for attachment via the shown screws to the terminals LiT, LnT and not shown terminal N1T and NnT. There is no need to attach both, the snap-in pins and the structured terminals, but they can be connected for attachment anyhow, as they are parallel connection of the same lines, shown in FIG. 10A as the line connecting each of the current sensor 97 with each of the L terminal of the socket 55, and neutral line connecting "each of the N terminals of each socket 55. The neutral terminals of the sockets 55 can be, and in many instances such terminals are, shorted by a metal bar and connected together to a single neutral wire.

The shown cables LG-A and LG-n are the two short cut lightguide or pigtail links, shown linking the TX/RX3 and TX/RXn with the optoports 56A and 56n in FIG. 10A. The links LG-A and LG-n can be supplied assembled with a specific length for the snap-in attachment. Such that the optoport cut surface of the link (the optoport) will be aligned with the AC socket surface. Alternatively the lightguide link can be fed separately and cut by a guillotine cutter to length as needed and attached to the one or more holders shown as LHA~LHn in FIG. 10C.

Instead of the short cut lightguide the shown holders LH-A and LH-n can be constructed to enclose the RX/TX3~n encapsulated in clear 3 mm diameter package, similar to a flat surface 3 mm small size LED, in a longer structure than the shown LH-A, structured such that the RX/TX3~n surfaces will be aligned with the surface of the AC sockets 55A-n surfaces.

The lightguide links LGA~LGn provide for different application, one is, for downloading via an optical loader through the front surface of an installed AC outlet the room or zone address and the particulars of the connected appliance, such as shown in the referenced applications, and/or loading the particulars of the AC outlet itself. Another is to communicate via the AC power cable assembly the appliance current drain and/or the appliance status. Yet another application is the two way propagation between the controller or the repeater and the appliance, including operational and other remote control commands and responses via the AC power cable assembly comprising lightguide and AC plug incorporating optoport for linking the optical signals between the AC outlet and the appliance disclosed in the referenced patents and application.

Figure 12A:
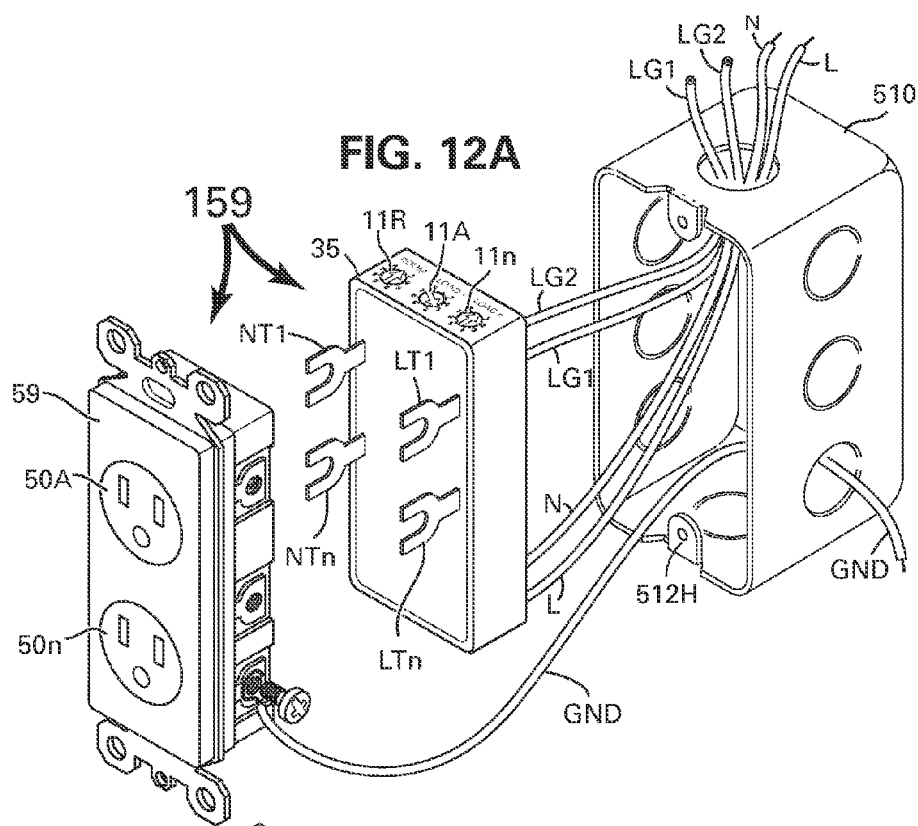
FIGS. 12A and 12B are illustrations of an AC power outlet without optoport for attachment to an AC device via screw terminals of the preferred embodiment of the present invention.
Figure 12B:
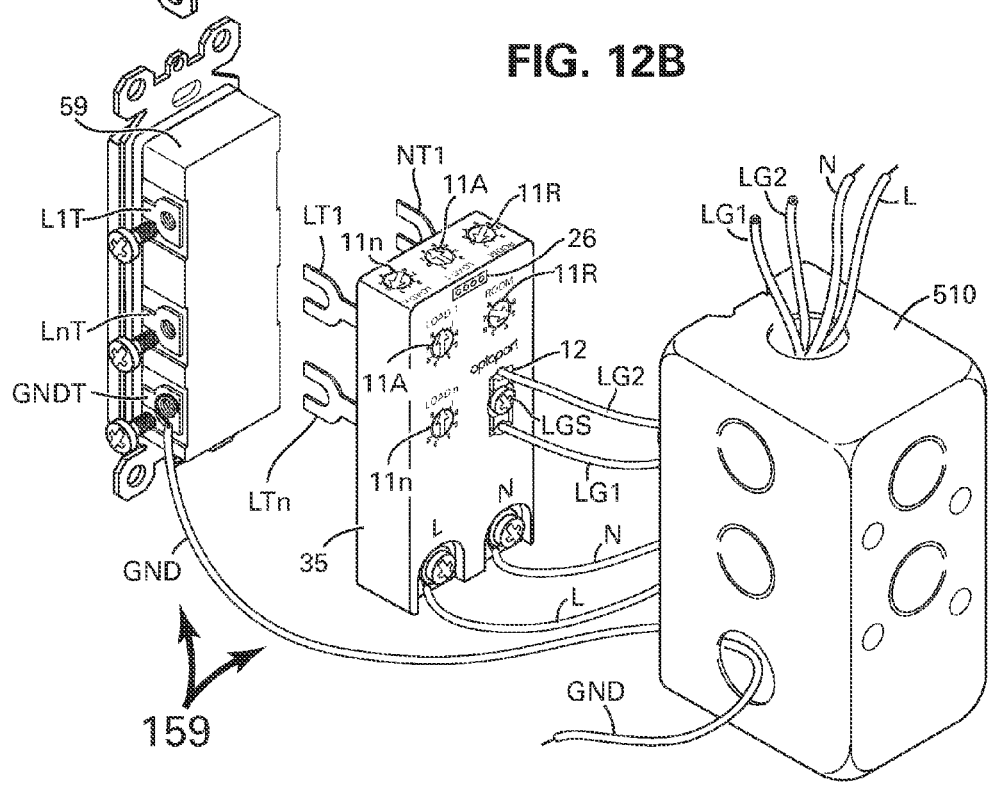

However, for currently used power plugs without optoport the current sensor can be operated without the optoports 56A~56n, by setting the room or zone addresses and the appliances type and identification via the setting switches at the rear or the top of the assembly 33 with only one set of setting switches is needed, the dual sets of switches are shown for reference only. It is similarly possible to load the addresses and the appliance type, identifications or other particulars via the rear optoports 12 during the installation, or at random by a service electrician. For such outlets the AC sockets need not to have the optoports accesses 56, and it can use the existing popular outlets 50 with no changes, such as shown in FIGS. 12A and 12B.

For such setup with no optoports in the sockets the TX/RX3 and TX/RXn along with LG-A and LG-n shown in FIGS. 10A~10C and the lightguide pigtail holders LHA and LHn are not needed and are not used. From all the above it is clear that the attaching of the AC current sensor device 33 to the AC outlets is similar to the attaching of the SPDT or DPDT switches to the AC switching devices of the present invention, and shown in FIGS. 5A and 5B, and that the combination 150 or 155 of the current sensors 33 with the modified popular AC sockets 58 can be installed into the same wall box with no change to the wall architecture.

FIGS. 11A and 11*b* show the current sensor 34 which is electrically identical and provide connections similar to the current sensor 33 explained above, but is structured to be mechanically attached to the single gang wall box, similar to AC switching device structure 71 shown in FIGS. 7A and 7B explained above. One difference between the switches and the outlet AC devices shown is in the number of the setting switches 11, shown in the current sensor devices are setting switches 11n. The 11n switches represent one switch for each AC socket outlet for setting the appliance type, including the appliance identification and other particulars. The setting switches 11R for setting room or zone address and 11A for setting the appliance particulars to be connected to one socket 50 or 55A is the same setting switch shown in all the AC switching devices drawings, one setting switch n is shown for each additional AC socket, be it a well known two pin power socket (no GND pin) and the three pin socket 50 or 55 shown with the GND terminal for earthing.

The current sensor assembly 34 is not provided with terminal for attachment by the screws shown to the power terminals L1T, LnT, N1T or NnT of the AC socket assembly 58, instead its pigtail LPT1, LPTn, NPT1 and NPTn can be attached via the screws to the terminal or into the snap-in LPS1~n and NPS1~n similar to the attachment of the pins LP-1~NP-n of FIGS. 10B and 10C.

The lightguide pigtail links LGA and LGn are either attached to the AC sockets 55 with optoports 56 or are not needed and not used with the AC sockets 50 without optoports. The current sensor 34 is attached to the wall box 510 by tightening the screws 72 to force the holder 71H to grip the inner box 510, exactly as explained above for AC switching device 71. Alternatively the current sensor 34 can be mounted between the box flap 512H and the socket assembly holder 51H via the socket locking screws (not shown), by using two of the shown holders 75H, precisely as described for the AC switching device 71 above. Otherwise all electrical connections and lightguide attachments are the same as described above for the current sensor 33 for providing the combination 160 without optoports and 165 with optoports of the present invention, into the single box 510 shown or a similar box for a single gang wiring device.

For larger AC outlet occupying, for example, dual gang wall box, two of the current sensors 33, 34 and 35 of the present invention can be used for such AC outlets, or another dual size AC current sensor can be made, constructed with a corresponding similar structure for attachment to dual gang or three gang size AC socket assemblies and/or dual or triple gang boxes (not shown).

FIGS. 12A and 12B illustrate the combining of the current sensor 35 with the AC outlet sockets assembly 59 without provision for optoports discussed above. The current sensor 35 similarly does not include the TX/RX3 and TX/RXn nor the pigtails shown in FIGS. 10~11B. As shown it is provided with terminal LT1, LTn, NT1 and NTn for attachment by the screws shown to the socket terminals L1T, LnT, N1T and NnT respectively. The combination 159 shown is the simplest to install and assemble, using the three wires Live L, Neutral N and GND for earthing of 3 pin power socket assembly. As stated above the GND terminals and wires are not needed and not used with the well known two pin power socket assemblies, be it one, two, three or more sockets (not shown) included in a power outlet assembly.

Otherwise, the cascading two lightguides LG1 and LG2 or a single (non cascading) lightguide LG1 or LG2 is attached to the lightguide optoports 12 and the room or zone addressing are set via the setting switches 11R, 11A and 11n or by loading the setting data via one of the optoport 12, using a PC with a loading adaptor (not shown) or via a loader disclosed in the referenced applications.

It becomes clear that a simple attachment to the many popular types of AC outlets and AC switches manufactured by different wiring devices manufacturers in the US and globally can be combined with AC switching devices and current sensors for providing not only the control functions as used currently with home automation, but to enable the reporting of current drains and the particulars of the power consuming appliances to the smart grid being contemplated around the world for energy saving, enabling for example the mart grid to adjust the load at peak times, but never disrupt, for example, health support and health care appliances by error, or for example never shut down refrigerators during hot summer days.

Figure 13:
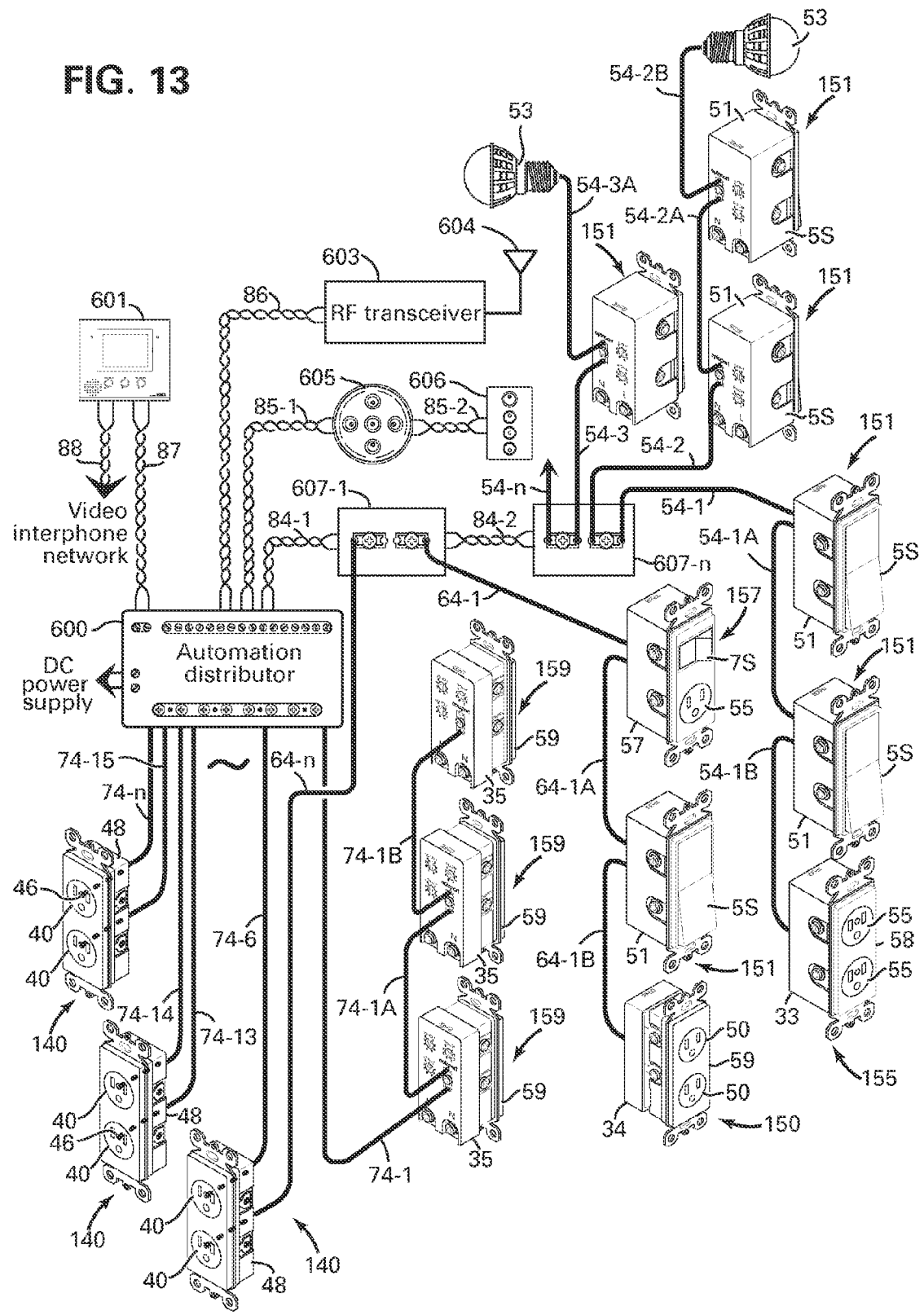
FIG. 13 is an illustration showing the system setup of the home automation including the controller, distributor, low voltage devices including IR drivers, RF transceiver, command converters and other elements of the system including the joined devices of the present invention.

FIG. 13 illustrates the two way or bidirectional control network for propagating control, confirmation, statuses and current drain of an electrical system as used with the AC devices of the present invention. The present invention of devices attached to the commonly used AC switches and power outlets in the residences and other premises, wherein for small residences it is possible to generate and broadcast any and all command to all the devices, and the replies such as confirmation, statuses and current drain data are broadcasted throughout the network for only the intended recipient to respond.

For larger residences or offices or businesses the control system can be partitioned. The automation distributor 600 re-propagates electrical signals, with or without power feed, to low voltage control devices via the twisted pairs shown as 84-1, 85-1 and 86. The command received from the connected low voltage control devices and from the dedicated controller, the shopping terminal or the video interphone monitor 601, disclosed in the referenced patents and applications, includes the designation or detail of the appliance and its location, based on which the distributor can be programmed to distribute and propagate the two way signals in a partitioned network. This is particularly important for the shown AC outlets 140, comprising a popular AC socket assembly 48, which is identical with the AC socket 58 but does not include the circuit shown in FIG. 10A.

For simplifying the explanation an identifying numeric 48 is used instead of 59 even though the shown AC outlet sockets are identical. The sockets themselves are numbered 40 and the optoports are numbered 46A to 46n. In such setup it is preferable to have the lightguides forming the optoports 46A~46n connected to the distributor 600 and to the lightguide converter 607-1 and/or to other converter such as 607-n, with each of the lightguides 64-n~74-n shown including each of the power sockets 40 are allotted a unique identification code or number.

Similarly the controller program provides for grouping a given number of lightguides 64-n~74-n attached to a given power sockets 40 in a given room or zone for partitioning the groups, or arbitrary separate the groups by design or otherwise for identifying the location where a current is drained at random by known or unknown appliance (load).

The same program identifies the location of a current drain by an identified appliance that is connected at random to one or the other of the power outlets 140, for example, via a current sensor adaptor with reciprocal optoport, an AC plug of a load with current sensor with reciprocal optoport, a power cable assembly of an appliance comprising lightguide and a power plug with reciprocal optoport of an appliance with current drain communication circuit, power cable with no lightguide in combination with power plug with current sensor and reciprocal optoport and other similar combinations, wherein the power cable communicates via its power plug, current sensor adaptor and by its interior circuits through the lightguide of the power cable the current drain to the controller through the AC socket 40. The reciprocal optoports of the current sensors are disclosed in the referenced application Ser. Nos. 12/725,808 and 12/761,484.

The remotely controlled appliances connected at random are further identified by a controller program by processing the control commands propagated to an appliance, be it IR or RF commands, or low voltage propagated commands and identifying the change in the current drain status of a given outlet 40, 50 or with unknown or when no appliance particulars are communicated, by detecting the timing coincidence of the propagated on-off commands and the detected change in current drain pertaining to a given socket 40, or 50 or 55. Moreover the program is automatically updating the last identified appliance to be the last appliance connected to the given socket 40 via its unique optoport 46 and/or its location within a given zone and/or within a partition group or otherwise identified group.

Further, the partitioning or the uniquely identified socket, is programmed to be an addition to the loading each of the optoports of the AC sockets 40 via a loader, disclosed in the referenced US applications, via the front of the installed AC outlet 48 with the location and the identification, including particulars of a known appliance connected to the socket 40 of the AC outlet 48. Any current drain or power consumption value communicated by, for example, a current sensor adaptor with optoport and with setting switches or memory for recording the particulars of the appliance and its location, the latest current drain with particulars data propagated overrides the last recorded appliance particulars. Whenever a different appliance or current sensor is attached to the AC socket 40 the distributor 600 will communicate the last recognized appliance to the controller 601 and through a network communicator via the network 88 and via the Internet (shown in the referenced applications) to the smart power grid or to the dweller mobile or iPod.

The shown adjustable IR ceiling repeater 605 and the wall IR repeater 606 are power fed and communicate via the non-polar cascading twisted pair lines 85-1 and 85-2, similarly the RF transceiver 603 communicates and is power fed via the twisted pair 86. Both the I repeaters 605 and 606 can communicate two way signals in air with the combined AC switching and AC outlet devices 150, 151, 155, 157 and 159, while the RF transceiver 603 communicates the RF signals via the antenna 604 with any of the devices discussed above incorporating the RF transceiver 91 including the antenna 92.

The shown lightguide converters communicate two way optical signals with the AC devices via the lightguide and the electrical signals with the controller 601 and with the distributors 600 via the twisted pairs 84 and 87. The distributor 600 and the lightguide converters 607 convert the electrical to optical signals and the optical signal to electrical signals, completing the two way communication throughout the network all the way to and from any of the optically linked AC devices to the controller 601 and beyond.

It becomes clear that the interconnections in combinations with low voltage control lines 84, 85, 86, 87 and 88 with or without feed of DC power, the lightguide or fiber optic cables, the RF and the IR in line of sight, can all be harmonized for implementing low cost, highly efficient home automation including the many appliances used in homes, offices or business.

The setup fully comply with the electric and building codes requirements and the AC devices combined with wiring devices including switches and AC outlets can be mounted into electrical boxes and interconnected by the lightguides that are electrically safe.

The light guides or fiber optic cables fully comply with the fire codes for such installations, offer a low cost solution to otherwise complex, expensive, and restricted by the electrical and fire hazard codes, rules and regulation. This harmonized interconnection and the two way commands in line of sight or via lightguides including the use of RF via an RF gateway 603 can solve the most complex systems that were seriously holding back the penetrations of electrical automation, including the needed automation in multi apartment buildings.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for introducing into an electrical box a joined device occupying a single gang area of a wall plate covering said box, said joined device consisting of a wiring device selected from a group comprising an SPDT mechanical switch, a DPDT mechanical switch, at least one power outlet and combinations thereof and an AC device selected from a group comprising an SPDT relay, a DPDT relay, at least one current sensor and combinations thereof:

said AC device further comprising at least one of a first transceiver selected from a group comprising RF, IR in line of sight, optical and combinations thereof for exchanging bidirectional signals with at least one of a distributor and a controller, a holder for attaching a terminated end of an optical cable to a first optical access of said optical transceiver, and at least one of a setting switch and a memory for setting at least one of a location and particulars of an appliance powered via said joined device;

said optical cable is selected from a group comprising lightguide, fiber optic and a combination thereof, said wiring device further including terminals selected from a group comprising at least one load terminal, at least one pair of traveler terminals, power terminals and combinations thereof, said terminals having a structure selected from a group comprising screw terminals, snap-in terminals and a combination thereof;

said AC device is attachable to said wiring device by a complementary joints selected from a group comprising screw joints, snap-in pins, pigtails and combinations thereof, and said joined device is covered by said wall plate having an opening for at least one of a key lever of said mechanical switch and for said power outlet, said method comprising the steps of:

a. attaching said at least one of a pair of said complementary joints to said at least one of a pair of terminals;

b. connecting AC power to said AC device and said at least one load to said wiring device;

c. setting said location and particulars through one of said setting switch and said memory;

d. terminating the two ends of at least one optical cable by a process selected from a group comprising cutting, trimming, shaping and combinations thereof for linking said first optical access with a second optical access of a second optical transceiver included in said one of distributor and controller via said two ends;

e. attaching said joined device to said electrical box;

f. covering said joined device and said electrical box by said wall plate with at least one of said key lever and said power outlet are accessible through said opening;

g. Powering said appliance manually via one of plugging a power plug of the appliance into said socket and actuating the key lever of said mechanical switch; and h. Reporting one of the current and power consumed including said automation control of said appliance via said exchanging bidirectional signals with at least one of said distributor and controller direct or via signal converter.

2. The method for introducing into an electrical box a joined device according to claim 1, wherein more than one said AC device is provided with at least two said optical transceivers for exchanging said bidirectional optical signal between a plurality of devices within a cascaded chain selected from a group comprising said joined devices, said appliance, said distributor, said controller, said signal converter and combinations thereof linked via, a cascading terminated ends of said optical cables, each attached to one said optical access of one said transceiver.

3. The method for introducing into an electrical box a joined device according to claim 1, wherein said AC device includes at least one indicator for indicating at least one of said appliance operating status and the status of said joint device through one of said wall plate and said key lever.

4. The method for introducing into an electrical box a joined device according to claim 1, wherein said wireless transceiver is one of an RF transceiver linked via RF antenna and IR transceiver accessed into line of sight through one of an opening in said wall plate and an IR transparent key lever.

5. The method for introducing into an electrical box a joined device according to claim 1, wherein at least one of said relay is a semiconductor relay.

6. The method for introducing into an electrical box a joined device according to claim 1, wherein one of a plurality of said joined devices and a plurality of wiring devices joined with a combination AC device are introduced to a multi gang electrical box with said wall plate having a size and said opening commensurate with one of said plurality of joined devices and said combination AC device with said plurality of wiring devices.

7. The method for introducing into an electrical box a joined device according to claim 2, wherein one of a plurality of said joined devices and a plurality of wiring devices joined with a combination AC device are introduced to a multi gang electrical box with said wall plate having a size and said opening commensurate with one of said plurality of said multi AC devices and said combination device with said plurality of wiring devices, and wherein said plurality of joined devices are linked via a cascading optical cables and said combination AC device is linked via a signal optical access for said reporting and said automation control of said plurality of wiring devices.

8. The method for introducing into an electrical box a joined device according to claim 2, wherein said joined device is said power outlet with said current sensor including at least one AC socket with a front optoport for linking optical signal to said appliance via said cascaded chain through a complimentary optoport enclosed in one of a power plug enclosing a fourth optical access of a fourth optical transceiver and a power plug with cable assembly including a terminated lightguide ends extended from said complementary optoport to an optical access of an optical transceiver enclosed in said appliance.

9. The method for introducing into an electrical box a joined device according to claim 8, wherein a plurality of said joined devices and a plurality of said wiring devices joined with a combination AC device are a plurality of said power outlets each selected from a group comprising AC socket without earthing and without front optoport, AC socket with earthing and without front optoport, AC socket without earthing and with front optoport, AC socket with earthing and with front optoport and combinations thereof.

10. The method for introducing into an electrical box a joined device according to claim 7, wherein one of a plurality of said joined devices and a plurality of said wiring devices joined with a combination AC device including at least one said power outlet with at least one AC socket with front optoport for linking optical signal to said appliance via said cascaded chain through a complimentary optoport enclosed in one of a power plug comprising one of a fourth optical access of a fourth optical transceiver and a power plug with cable assembly including a terminated lightguide ends extended from said complementary optoport to an optical access of an optical transceiver enclosed in said appliance.

11. The method for introducing into an electrical box a joined device according to claim 10, wherein one of said plurality of said joined devices and said plurality of wiring devices joined with said combination AC device are a plurality of said power outlets each selected from a group comprising AC socket without earthing and without front optoport, AC socket with earthing and without front optoport, AC socket without earthing and with front optoport, AC socket with earthing and with front optoport and combinations thereof.

12. The method for introducing into an electrical box a joined device according to claim 1, wherein said wiring device is at least one AC power outlet including a front optoport at its socket front surface, said front optoport comprising one of a third optical access of a third optical transceiver and a terminated end of a lightguide pigtail linking said front optoport with said third optical access include in said AC device for communicating via a complimentary optoport included in a power plug of said load bidirectional optical signals pertaining to at least one of a current drained and a power consumed by a load through said power outlet;

said joined device further propagating said bidirectional optical signals via said first optical transceiver to said second optical transceiver of said one of distributor and controller direct and via a fifth optical transceiver of said signal converter, said complementary optoport is selected from a group comprising an optical access of a fourth optical transceiver included in said power plug, an optical access of an optical transceiver included in a current sensing and communication adaptor, a terminated end of a lightguide included in a power cable assembly and combinations thereof, said method comprising the amended steps of:

a. joining said power outlet to said AC device by attaching the terminals of at least one power outlet to said complementary joints;
b. terminating the ends of at least one lightguide;
c. attaching said third optical access to said front optoport via one of direct and said lightguide pigtail;
d. extending and attaching the two terminated ends of said at least one lightguide between said first optical access and one of said second and a fifth optical access;
e. connecting said AC device to AC power;
f. attaching said joined device to said electrical box;
g. setting at least one of said location at load particulars;
h. covering said joined device and said electrical box by said wall plate with said front socket surface and said front optoport are accessible through said opening; and
i. plugging said power plug to said AC socket and communicating said bidirectional optical signal.

13. The method for introducing into an electrical box a joined device according to claim 12, wherein said bidirectional optical signal is selected from a group comprising controls for operating said load, commands for switching said load on-off, request for said current drain data, request for said load operation status, confirmation, said current drain data, said operation status and combinations thereof.

14. An AC device for introducing into an electrical box a joined device consisting of a wiring device selected from a group comprising SPDT mechanical switch, DPDT mechanical switch, electrical outlet and combinations thereof joined with said AC device selected from a group comprising an SPDT relay, a DPDT relay, a current sensor and combinations thereof, occupying a single gang area of a wall plate covering said box;

said AC device including at least one of a wireless transceiver and an optical transceiver with an optical access including a holder for attaching a terminated end of at least one lightguide to said access, terminated by a process selected from a group comprising cutting, trimming, shaping and combinations thereof and at least one of a setting switch and a memory for setting at least one of a location and particulars of an appliance powered via said joined device;

said transceiver for communicating with at least one of a distributor and a controller bidirectional signals selected from a group comprising optical signal via said lightguide, IR in line of sight, RF and combinations thereof for at least one of controlling said joined device and reporting one of a current drained and power consumed by said appliance;

said wiring device including terminals selected from a group comprising at least one load terminal for connecting a load, at least one pair of traveler terminals for connecting the traveler terminals of one of said SPDT and DPDT switch, power terminals for connection to the AC power and combinations thereof, said terminals having a structure selected from a group comprising screw terminals, snap-in terminals and a combination thereof, said AC device is attachable to said wiring device by a complementary joints selected from a group comprising screw joints, snap-in pins, pigtails and combinations thereof including power terminals for connection to AC power and for attachment to said wiring device;

said joined device attaches to said electrical box and is covered by said wall plate having an opening for accessing at least one of a key lever of said mechanical switch and said power outlet for powering said appliance manually by one of plugging a power plug to said power socket and actuating said mechanical switch via said key lever or via said automation by said communicating with at least one of said distributor and controller said bidirectional signals direct or via a signal converter.

15. The AC device for introducing into an electrical box a joined device according to claim 14, wherein more than one said AC device is provided with at least two said optical transceivers for exchanging said bidirectional optical signal between a plurality of devices within a cascaded chain selected from a group comprising said joined devices, said appliance, said distributor, said controller, said signal converter and combinations thereof linked via a cascading terminated ends of said optical cables, each attached to one said optical access of one said transceiver.

16. The AC device for introducing into an electrical box a joined device according to claim 14, wherein said AC device includes at least one indicator for indicating at least one of said appliance operating status and the status of said joint device through one of said wall plate and said key lever.

17. The AC device for introducing into an electrical box a joined device according to claim 14, wherein said wireless transceiver is one of an RF transceiver linked via RF antenna and IR transceiver accessed through one of an opening in said wall plate and an IR transparent key lever.

18. The AC device for introducing into an electrical box a joined device according to claim 14, wherein at least one of said relay is a semiconductor relay.

19. The AC device for introducing into an electrical box a joined device according to claim 14, wherein one of a plurality of said joined devices and a plurality of wiring devices joined with a combination AC device are introduced to a multi gang electrical box with said wall plate having a size and said opening commensurate with one of said plurality of said multi AC devices and said combination AC device with said plurality of wiring devices.

20. The AC device for introducing into an electrical box a joined device according to claim 15, wherein one of a plurality of said joined devices and a plurality of said wiring devices joined with a combination AC device are introduced to a multi gang electrical box and said wall plate having a size and said opening commensurate with one of said plurality of said joined devices and said combination AC device with said plurality of wiring devices, and wherein said plurality of joined devices are linked via cascading optical cables and said combination AC device is linked via a single optical access for said reporting and said automation control of said plurality of wiring devices.

21. The AC device for introducing into an electrical box a joined device according to claim 15, wherein said joined device is said power outlet with said current sensor including at least one AC socket with a front optoport for linking optical signal to said appliance via said cascaded chain through a complimentary optoport enclosed in one of a power plug of a load comprising an optical access of a fourth optical transceiver and a power plug with cable assembly comprising a terminated lightguide ends extended from said complementary optoport to an optical access of an optical transceiver enclosed in said appliance.

22. The AC device for introducing into an electrical box a joined device according to claim 21, wherein a plurality of said joined devices and a plurality of said wiring devices joined with a combination AC device are a plurality of power sockets each selected from a group comprising AC socket without earthing and without front optoport, AC socket with earthing and without front optoport, AC socket without earthing and with front optoport, AC socket with earthing and with front optoport and combinations thereof.

23. The AC device for introducing into an electrical box a joined device according to claim 20, wherein one of a plurality of said joined devices and a plurality of said wiring devices joined with a combination AC device including at least one said power outlet with at least one AC socket with front optoport for linking optical signal to said appliance via said cascaded chain through a complimentary optoport for enclosed in one of a power plug of a comprising one of a fourth optical access of a fourth optical transceiver and a power plug with cable assembly including a terminated lightguide end extended from said complementary optoport to an optical access of an optical transceiver enclosed in said appliance.

24. The AC device for introducing into an electrical box a joined device according to claim 23, wherein one of said plurality of said joined devices and said plurality of wiring devices joined with said combination AC device are a plurality of power sockets each selected from a group comprising AC socket without earthing and without front optoport, AC socket with earthing and without front optoport, AC socket without earthing and with front optoport, AC socket with earthing and with front optoport and combinations thereof.

25. The AC device for introducing into an electrical box a joined device according to claim 14, wherein said wiring device is at least one AC power outlet including a front optoport at its socket front surface, said front optoport comprising one of a third optical access of a third optical transceiver and a terminated end of a lightguide pigtail linking said front optoport with said third optical access included in said AC device for at least one of communicating bidirectional optical signals pertaining to at least one of a current drained and a power consumed by a load through said power outlet;

said front optoport exchanging said bidirectional optical signals with a complimentary optoport included in an AC of said load and said joined device further propagating said bidirectional signals through said first optical transceiver to at least one of said distributor and said controller, said complimentary optoport is selected from a group comprising an optical access of a fourth optical transceiver included in an AC plug, an optical access of an optical transceiver included in a current sensing and communication adaptor, a terminated end of a lightguide included in a power cable assembly and combinations thereof.

26. The AC device for introducing into an electrical box a joined device according to claim 25, wherein said bidirectional optical signal is selected from a group comprising controls for operating said load, commands for switching said load on-off, request for one of said current drain and power consumption data, request for said load operation status, confirmation, said current drain data, said power consumption data, said operation status and combinations thereof.

* * * * *